United States Patent
Seguine

(10) Patent No.: US 8,902,173 B2
(45) Date of Patent: Dec. 2, 2014

(54) POINTING DEVICE USING CAPACITANCE SENSOR

(75) Inventor: Dennis Seguine, Monroe, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 971 days.

(21) Appl. No.: 11/903,878

(22) Filed: Sep. 24, 2007

(65) Prior Publication Data

US 2008/0078590 A1 Apr. 3, 2008

Related U.S. Application Data

(60) Provisional application No. 60/848,121, filed on Sep. 29, 2006.

(51) Int. Cl.
*G06F 3/041* (2006.01)
*G06F 3/0354* (2013.01)
*G06F 3/044* (2006.01)

(52) U.S. Cl.
CPC ............ *G06F 3/03548* (2013.01); *G06F 3/044* (2013.01)
USPC ........... 345/173; 345/157; 345/156; 345/161; 345/184; 345/160; 345/168

(58) Field of Classification Search
None
See application file for complete search history.

(56) References Cited

U.S. PATENT DOCUMENTS

| | | | |
|---|---|---|---|
| 4,103,252 A | 7/1978 | Bobick | |
| 4,113,378 A | 9/1978 | Wirtz | |
| 4,719,455 A * | 1/1988 | Louis | 345/184 |
| 4,719,538 A * | 1/1988 | Cox | 361/283.2 |
| 4,736,191 A * | 4/1988 | Matzke et al. | 341/20 |
| 4,831,325 A | 5/1989 | Watson, Jr. | |
| 5,287,121 A * | 2/1994 | Louis et al. | 345/179 |
| 5,305,017 A | 4/1994 | Gerpheide | |
| 5,374,787 A | 12/1994 | Miller et al. | |
| 5,489,922 A | 2/1996 | Zloof | |
| 5,495,077 A | 2/1996 | Miller et al. | |
| 5,543,590 A | 8/1996 | Gillespie et al. | |
| 5,648,642 A | 7/1997 | Miller et al. | |
| 5,696,535 A | 12/1997 | Rutledge et al. | |
| 5,781,178 A * | 7/1998 | Roehm et al. | 345/157 |
| 5,841,078 A | 11/1998 | Miller et al. | |
| 5,854,625 A | 12/1998 | Frisch et al. | |
| 5,861,583 A | 1/1999 | Schediwy et al. | |
| 5,914,465 A | 6/1999 | Allen et al. | |
| 5,920,310 A | 7/1999 | Faggin et al. | |
| 5,942,733 A | 8/1999 | Allen et al. | |
| 5,943,052 A | 8/1999 | Allen et al. | |
| 5,945,980 A | 8/1999 | Moissev et al. | |

(Continued)

OTHER PUBLICATIONS

USPTO Notice of Allowance for U.S. Appl. No. 11/395,417 dated Nov. 6, 2008; 7 pages.

(Continued)

*Primary Examiner* — Jesus Hernandez
(74) *Attorney, Agent, or Firm* — Lowenstein Sandler LLP

(57) ABSTRACT

Apparatuses and methods for determining a deflection of a moveable conductive plate that is moved over a capacitive sensing device. The method may include moving the moveable conductive plate over sensor elements of the capacitive sensing device, and determining the deflection of the moveable conductive plate. In determining the deflection, a deflection magnitude and a deflection direction may be determined by calculating a vector of x- and y-directions or a vector of a radius and an angle.

15 Claims, 12 Drawing Sheets

(56) References Cited

U.S. PATENT DOCUMENTS

| | | |
|---|---|---|
| 6,184,865 B1 | 2/2001 | Zimmerman et al. |
| 6,184,871 B1 | 2/2001 | Teres et al. |
| 6,188,391 B1 | 2/2001 | Seely et al. |
| 6,204,838 B1 | 3/2001 | Wang et al. |
| 6,380,931 B1 | 4/2002 | Gillespie et al. |
| 6,400,354 B1 | 6/2002 | Pin-Chien |
| 6,414,671 B1 | 7/2002 | Gillespie et al. |
| 6,448,911 B1 | 9/2002 | Somajayula |
| 6,508,137 B2 * | 1/2003 | Suzuki .................... 73/862.043 |
| 6,570,557 B1 | 5/2003 | Westerman et al. |
| 6,583,632 B2 | 6/2003 | Von Basse et al. |
| 6,587,093 B1 | 7/2003 | Shaw et al. |
| 6,610,936 B2 | 8/2003 | Gillespie et al. |
| 6,642,857 B1 | 11/2003 | Schediwy et al. |
| 6,667,740 B2 | 12/2003 | Ely et al. |
| 6,677,932 B1 | 1/2004 | Westerman |
| 6,750,852 B2 | 6/2004 | Gillespie et al. |
| 6,781,577 B2 | 8/2004 | Shigetaka |
| 6,809,275 B1 | 10/2004 | Cheng et al. |
| 6,825,673 B1 | 11/2004 | Yamaoka |
| 6,831,629 B2 | 12/2004 | Nishino et al. |
| 6,888,538 B2 | 5/2005 | Ely et al. |
| 6,922,063 B2 | 7/2005 | Heger |
| 6,946,853 B2 | 9/2005 | Gifford et al. |
| 7,006,078 B2 | 2/2006 | Kim |
| 7,040,182 B2 | 5/2006 | Teraoka |
| 7,068,039 B2 | 6/2006 | Parker |
| 7,075,316 B2 | 7/2006 | Umeda et al. |
| 7,084,854 B1 | 8/2006 | Moore et al. |
| 7,098,675 B2 | 8/2006 | Inaba et al. |
| 7,151,431 B2 | 12/2006 | Ooba et al. |
| 7,212,189 B2 | 5/2007 | Shaw et al |
| 7,504,833 B1 | 3/2009 | Seguine |
| 7,598,822 B2 | 10/2009 | Rajagopal et al. |
| 7,602,376 B1 | 10/2009 | Hetherington |
| 8,125,445 B1 | 2/2012 | Anderson |
| 2001/0007449 A1 * | 7/2001 | Kobachi et al. ............... 345/156 |
| 2003/0091220 A1 | 5/2003 | Sato et al. |
| 2004/0017355 A1 | 1/2004 | Shim |
| 2004/0252109 A1 | 12/2004 | Trent, Jr. et al. |
| 2005/0031175 A1 | 2/2005 | Hara et al. |
| 2005/0099393 A1 * | 5/2005 | Johnson ........................ 345/163 |
| 2006/0022937 A1 * | 2/2006 | Matta et al. ................... 345/156 |
| 2006/0066582 A1 | 3/2006 | Lyon et al. |
| 2006/0097991 A1 | 5/2006 | Hotelling et al. |
| 2006/0238205 A1 | 10/2006 | Francis |
| 2006/0238514 A1 * | 10/2006 | Rosenberg et al. ............ 345/173 |
| 2006/0267933 A1 | 11/2006 | Tai et al. |
| 2007/0247423 A1 * | 10/2007 | Harley et al. .................. 345/157 |

OTHER PUBLICATIONS

USPTO Non-Final Rejection for U.S. Appl. No. 11/395,417 dated Apr. 25, 2008; 7 pages.

USPTO Non-Final Rejection for U.S. Appl. No. 11/395,417 dated Nov. 1, 2008; 8 pages.

USPTO Advisory Action for U.S. Appl. No. 11/395,417 dated Jul. 6, 2007; 3 pages.

USPTO Final Rejection for U.S. Appl. No. 11/395,417 dated Apr. 24, 2007; 9 pages.

USPTO Non-Final Rejection for U.S. Appl. No. 11/395,417 dated Oct. 26, 2006; 13 pages.

USPTO Non-Final Rejection for U.S. Appl. No. 12/367,279 dated Oct. 29, 2009; 8 pages.

Dennis Seguine, "Capacitive Switch Scan," Cypress Semiconductor Application Note; Apr. 14, 2005; 7 pages.

The Authoritative Dictionary of IEEE Standards Terms, 2000, IEEE Press Publications, 7th Edition, pp. 1133-1134; 4 pages.

Ryan Seguine, et al., "Layout Guidelines for PSoC™ CapSense™", Cypress Application Note AN2292, Revision B, Oct. 31, 2005, pp. 1-15.

Dave Van Ess, "Understanding Switched Capacitor Analog Blocks", Cypress Application Note AN2041, Revision B, Mar. 30, 2004, pp. 1-16.

Mark Lee, "CapSense Best Practices", Cypress Application Note AN2394, Rev.**, Oct. 19, 2006, pp. 1-10.

Mark Lee, "The Art of Capacitive Touch Sensing", Cypress Perform, Published in Embedded.com (http://www.embedded.com), Mar. 2007, pp. 1-10.

CSR User Module Data Sheet, CSR v1.0, CY8C21x34 Data Sheet, Oct. 6, 2006, pp. 1-36.

CSD User Module Data Sheet, CSD v1.0, Oct. 23, 2006, pp. 1-58.

Robert Jania, "Cypress CapSense Successive Approximation Algorithm", White Paper CSA RJO.doc, Jan. 17, 2007, pp. 1-6.

Dennis Seguine, "Automatically Balanced Sensing Device and Method for Multiple Capacitive Sensors", Patent Application, filed Mar. 31, 2006, 35 pages.

USPTO Non-Final Rejection for U.S. Appl. No. 12/011,403 dated Jan. 21, 2011; 6 pages.

USPTO Non-Final Rejection for U.S. Appl. No. 12/011,403 dated Jun. 22, 2011; 8 pages.

USPTO Notice of Allowance for U.S. Appl. No. 12/011,403 dated Dec. 27, 2011; 7 pages.

* cited by examiner

US 8,902,173 B2

POINTING DEVICE USING CAPACITANCE SENSOR

RELATED APPLICATIONS

This application claims the benefit of U.S. Provisional Application No. 60/848,121, filed Sep. 29, 2006.

TECHNICAL FIELD

This invention relates to the field of user interface devices and, in particular, to touch-sensor devices.

BACKGROUND

Computing devices, such as notebook computers, personal digital assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two array, detecting movement in one axis. The sensor array may also be two dimensional, detecting movements in two axes.

One type of touchpad operates by way of capacitance sensing utilizing capacitive sensors. The capacitance detected by a capacitive sensor changes as a function of the proximity of a conductive object to the sensor. The conductive object can be, for example, a stylus or a user's finger. In a touch-sensor device, a change in capacitance detected by each sensor in the X and Y dimensions of the sensor array due to the proximity or movement of a conductive object can be measured by a variety of methods. The touch-sensor devices may include single sensor elements or elements arranged in multiple dimensions for detecting a presence of the conductive object on the touch-sensor device. Regardless of the method, usually an electrical signal representative of the capacitance detected by each capacitive sensor is processed by a processing device, which in turn produces electrical or optical signals representative of the position of the conductive object in relation to the touch-sensor pad in the X and Y dimensions. A touch-sensor strip, slider, or button operates on the same capacitance-sensing principle.

FIG. 1A illustrates a conventional touch-sensor pad. The touch-sensor pad 100 includes a sensing surface 101 on which a conductive object may be used to position a pointer in the x- and y-axes, using either relative or absolute positioning, or to select an item on a display. Touch-sensor pad 100 may also include two buttons, left and right buttons 102 and 103, respectively, shown here as an example. These buttons are typically mechanical buttons, and operate much like a left and right buttons on a mouse. These buttons permit a user to select items on a display or send other commands to the computing device.

FIG. 1B illustrates a conventional linear touch-sensor slider. The Linear touch-sensor slider 110 includes a surface area 111 on which a conductive object may be used to control a setting on a device, such as volume or brightness. Alternatively, the linear touch-sensor slider 110 may be used for scrolling functions. The construct of touch-sensor slider 110 may be the same as that of touch-sensor pad 100. Touch-sensor slider 110 may include a sensor array capable of detection in only one dimension (referred to herein as one-dimensional sensor array). The slider structure may include one or more sensor elements that may be conductive traces. By positioning or manipulating a conductive object in contact or in proximity to a particular portion of the slider structure, the capacitance between each conductive trace and ground varies and can be detected. The capacitance variation may be sent as a signal on the conductive trace to a processing device. It should also be noted that the sensing may be performed in a differential fashion, obviating the need for a ground reference. For example, by detecting the relative capacitance of each sensor element, the position and/or motion (if any) of the external conductive object can be determined. In one embodiment, it can be determined which sensor element has detected the presence of the conductive object, and it can also be determined the motion and/or the position of the conductive object over multiple sensor elements.

One difference between touch-sensor sliders and touch-sensor pads may be how the signals are processed after detecting the conductive objects. Another difference is that the touch-sensor slider is not necessarily used to convey absolute positional information of a conducting object (e.g., to emulate a mouse in controlling pointer positioning on a display), but rather relative positional information. However, the touch-sensor slider and sensor slider and touch-sensor pad may be configured to support either relative or absolute coordinates, and/or to support one or more touch-sensor button functions of the sensing device.

FIG. 1C illustrates a conventional sensing device having three touch-sensor buttons. Conventional sensing device 120 includes button 121, button 122, and button 123. These buttons may be capacitive touch-sensor buttons. These three buttons may be used for user input using a conductive object, such as a finger.

Capacitance sensing has been implemented in a wide variety of user interfaces of electronic devices to replace mechanical buttons in the electronic devices. Examples include touchpads on notebook computers, touchscreens, slider controls used for menu navigation in cellular phones, personal music players, and other hand held electronic devices. Capacitance sensing has many advantages over conventional cursor control devices, mechanical switches, and rotary encoders. A principal such advantage is the lack of moving parts, which allows capacitance sensing to provide great improvements in reliability, since there are no moving parts to wear out.

Some problems with conventional computing devices are that a mouse is a separate device and requires significant desk area to use; a track pad requires a large number of x-y sensors and significant computation to resolve directional inputs; and a joystick is physically bulky in three dimensions.

BRIEF DESCRIPTION OF THE DRAWINGS

The present invention is illustrated by way of example, and not by way of limitation, in the figures of the accompanying drawings.

DETAILED DESCRIPTION

Figure 1A:
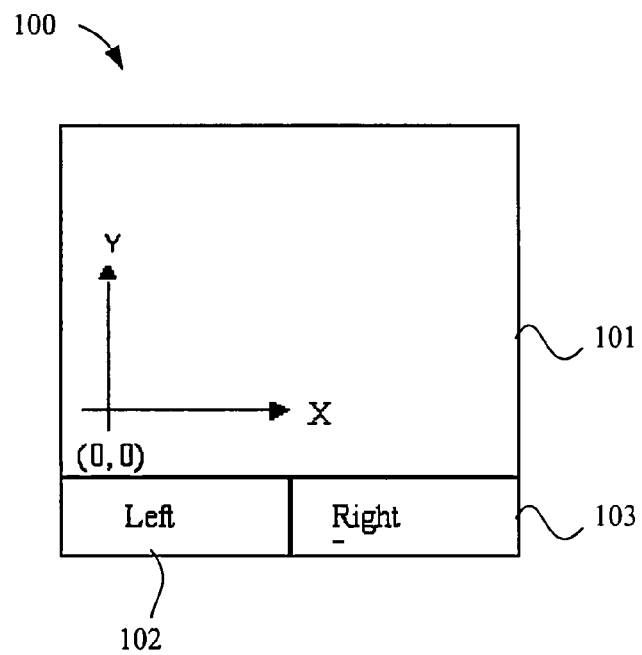
FIG. 1A illustrates a conventional touch-sensor pad.
Figure 1B:
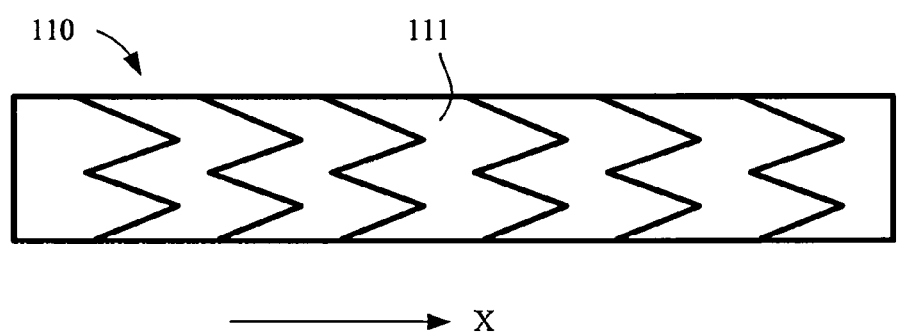
FIG. 1B illustrates a conventional linear touch-sensor slider.
Figure 1C:
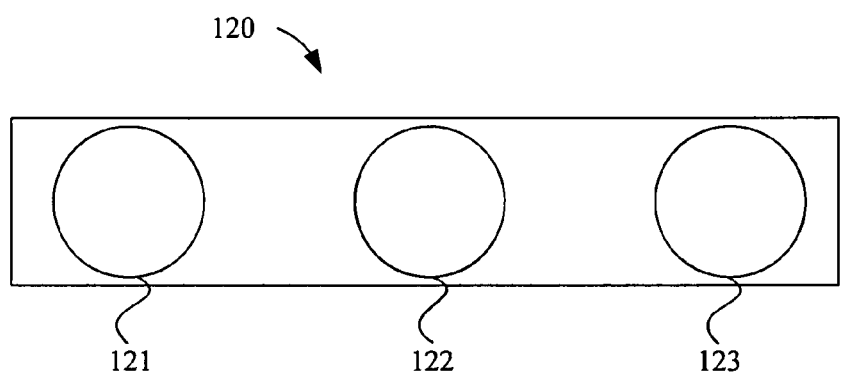
FIG. 1C illustrates a conventional sensing device having three touch-sensor buttons.

Described herein are apparatuses and methods for determining a deflection of a moveable conductive plate that is moved over a capacitive sensing device. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of a method and apparatus are described to determine a deflection of a moveable conductive plate that is moved over a capacitive sensing device. The method may include moving the moveable conductive plate over sensor elements of the capacitive sensing device, and determining the deflection of the moveable conductive plate. In determining the deflection, a deflection magnitude and a deflection direction may be determined by calculating a vector of x- and y-directions or a vector of a radius and an angle. In one embodiment, the deflection magnitude and direction are determined by computing a two-sided centroid, which includes computing a minimum centroid and a maximum centroid. The minimum and maximum centroids are combined to compute the deflection magnitude and direction.

In another embodiment, the method further includes measuring a first capacitance and a second capacitance on two separate sensor elements, respectively, while the moveable conductive object is located at a known position (also referred to herein as "zero" position) relative to the two sensor elements. After measuring the first and second capacitances, a third capacitance and a fourth capacitance are measured on the two sensor elements while the moveable conductive object is located in a second position. The deflection is determined using the first, second, third, and fourth capacitances. The deflection may be determined using a magnitude and direction vector that is representative of the change in capacitance on the two sensor elements from the known position to the second position. Alternatively, more than two sensor elements may be used, such as, for example, a circular pattern of four or more sensor elements. After the conductive object has been moved to the second position, the moveable conductive object can be automatically centered to the known position, for example, by a spring mechanism.

In one embodiment, a pointing device, using a capacitance sensor, may be used in a computing device (e.g., desktop, laptop, palmtop, etc.) keyboard that may replace a mouse, touch sensor pad or force-sensing joystick. Alternatively, the pointing device described herein may be used in a computing device in addition to one or more of a mouse, touch sensor pad or force-sensing joystick.

In one embodiment, a pointing device includes multiple sensor elements disposed in a first plane. The pointing device also includes a moveable object that is configured to move in a second plane that is substantially parallel to the first plane. A portion of, or the entire surface of the moveable object is a conductive surface. The pointing pointing device may include a housing that is coupled to the moveable object and a circuit board upon which the multiple sensor elements are disposed. A spring mechanism may be coupled between the housing and the moveable object and is configured to return the moveable object to a known position after being moved by the user. In another embodiment, a self-centering device is coupled to the moveable object, and is configured to automatically center the moveable object to the known position after being moved by the user.

In another embodiment, a processing device is coupled to the multiple sensor elements to receive multiple signals and to determine a deflection of the moveable conductive object that is moved relative to the sensor elements based on the received signals. The processing device may be mounted to a circuit board, upon which the multiple sensor elements are disposed. Alternatively, the processing device is mounted remotely from the circuit board or other structure, upon which the sensor elements are disposed.

The embodiments described herein use the sensor elements that are coupled to a processing device to determine the deflection of a moveable conductive object that is automatically centered after being moved from the known position. The embodiments described herein may provide an advantage over conventional capacitance sensing systems by having an integrated user interface that determines deflection of a moveable conductive object, such as, could be used in a joystick of a keyboard. Since capacitance sensing is used, the embodiments described herein may be implemented in a smaller area than conventional devices. The embodiments described herein may also provide an advantage over conventional capacitance sensing systems by reducing the desk area or surface area of a area or surface area of a device to implement the user interface, and the physical dimensions of the user interface in three dimensions. The embodiments described herein may also provide the benefit of reducing the number of x-y sensors, as well as the computations to resolve directional inputs.

Figure 2:
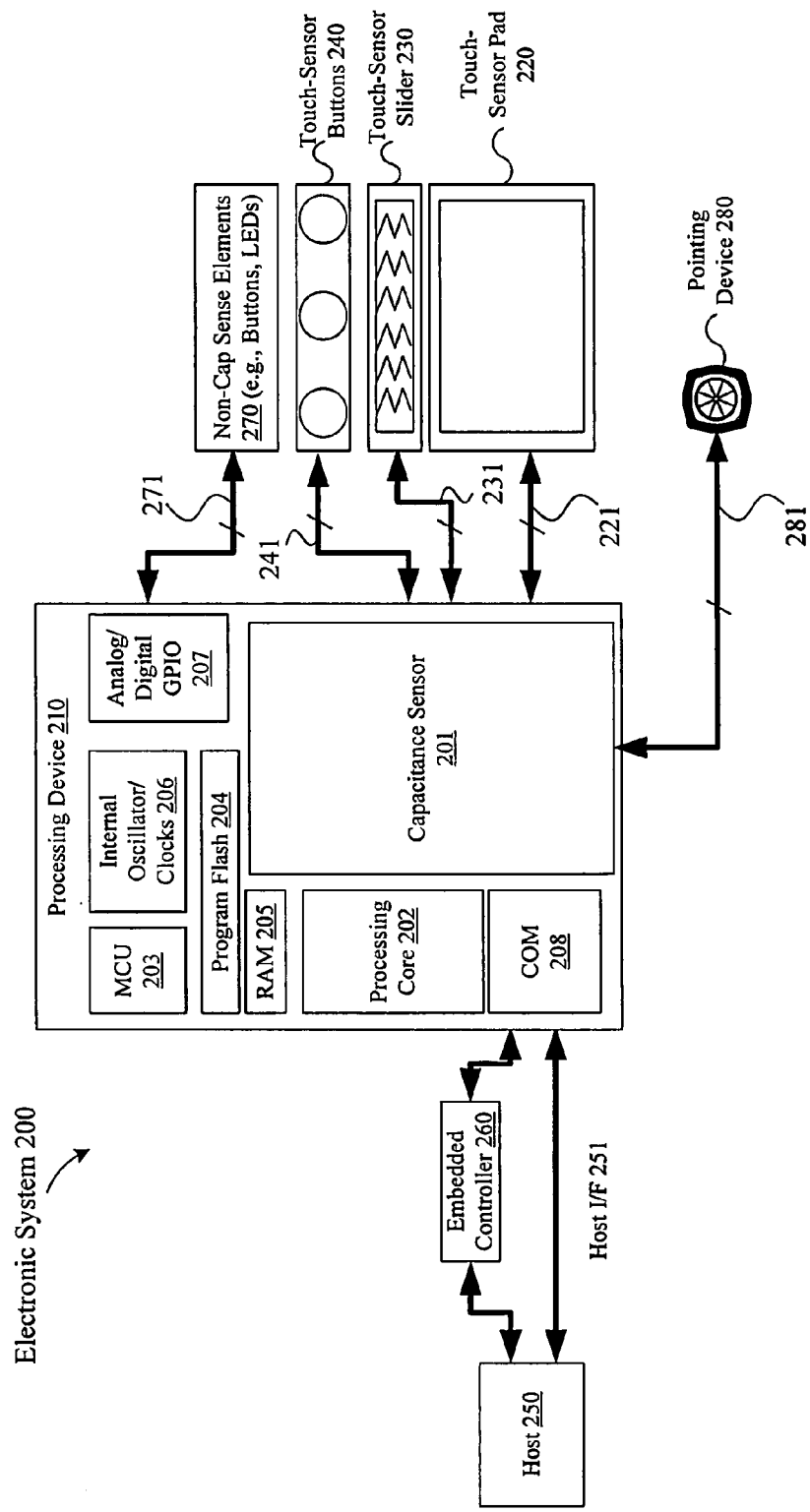
FIG. 2 illustrates a block diagram of one embodiment of an electronic system having a processing device for detecting a presence of a conductive object.

FIG. 2 illustrates a block diagram of one embodiment of an electronic system having a processing device for detecting a presence of a conductive object. Electronic system 200 includes processing device 210, touch-sensor pad 220, touch-sensor slider 230, touch-sensor buttons 240, host processor 250, embedded controller 260, non-capacitance sensor elements 270, and pointing device 280. The processing device 210 may include analog and/or digital general purpose input/output ("GPIO") ports 207. GPIO ports 207 may be programmable. GPIO ports 207 may be coupled to a Programmable Interconnect and Logic ("PIL"), which acts as an interconnect between GPIO ports 207 and a digital block array of the processing device 210 (not illustrated). The digital block array may be configured to implement a variety of digital logic circuits (e.g., DAC, digital filters, digital control systems) using, in one embodiment, configurable user modules ("UMs"). The digital block array may be coupled to a system bus (not illustrated). Processing device 210 may also include memory, such as random access memory (RAM) 205 and program flash 204. RAM 205 may be static RAM (SRAM) or the like, and program flash 204 may be a non-volatile storage, or the like, which may be used to store firmware (e.g., control algorithms executable by processing core 202 to implement operations described herein). Processing device 210 may also include a memory controller unit (MCU) 203 coupled to memory and the processing core 202.

The processing device 210 may also include an analog block array (not illustrated). The analog block array is also coupled to the system bus. Analog block array also may be configured to implement a variety of analog circuits (e.g., ADC, analog filters) using, in one embodiment, configurable UMs. The analog block array may also be coupled to the GPIO 207.

As illustrated, capacitance sensor 201 may be integrated into processing device 210. Capacitance sensor 201 may include analog I/O for coupling to an external component, such as touch-sensor pad 220, touch-sensor slider 230, touch-sensor buttons 240, and/or other devices. Capacitance sensor 201 and processing device 210 are described in more detail below.

It should be noted that the embodiments described herein are not limited to touch-sensor pads for notebook implementations, but can be used in other capacitive sensing implementations, for example, the sensing device may be a touch screen, a touch-sensor slider 230, or a touch-sensor button 240 (e.g., capacitance sensing button). It should also be noted that the embodiments described herein may be implemented in other sensing technologies than capacitive sensing, such as resistive, optical imaging, surface acoustical wave (SAW), infrared, dispersive signal, strain gauge technologies, or the like. Similarly, the operations described herein are not limited to notebook pointer operations, but can include other operations, such as lighting control (dimmer), temperature or environmental control, volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and (ex. display brightness and contrast), scroll-wheels, multi-media control (ex. volume, track advance, etc.) handwriting recognition and numeric keypad operation.

In one embodiment, the electronic system 200 includes a touch-sensor pad 220 coupled to the processing device 210 via bus 221. Touch-sensor pad 220 may include a two-dimension sensor array. The two-dimension sensor array includes multiple sensor elements, organized as rows and columns. In another embodiment, the electronic system 200 includes a touch-sensor slider 230 coupled to the processing device 210 via bus 231. Touch-sensor slider 230 may include a single-dimension sensor array. The single-dimension sensor array includes multiple sensor elements, organized as rows, or alternatively, as columns. In another embodiment, the electronic system 200 includes touch-sensor buttons 240 coupled to the processing device 210 via bus 241. Touch-sensor button 240 may include a single-dimension or multi-dimension sensor array. The single- or multi-dimension sensor array includes multiple sensor elements. For a touch-sensor button, the sensor elements may be coupled together to detect a presence of a conductive object over the entire surface of the sensing device. Alternatively, the touch-sensor button 240 has a single sensor element to detect the presence of the conductive object. In one embodiment, the touch-sensor button 240 may be a capacitance sensor element. Capacitance sensor elements may be used as non-contact sensors. These sensor elements, when protected by an insulating layer, offer resistance to severe environments.

In one embodiment, the electronic system 200 includes a pointing device 280 coupled to the processing device 210 via bus 281. The pointing device 280 may include a sensor array of sensor elements. In one embodiment, the sensor elements of the sensor array are disposed in a substantially circular pattern. The outer diameter of the sensor array is sensor array is substantially aligned with a conductive trace that is disposed on the moveable object when the moveable object is in a known, center position. The sensor elements may have a tapered shape that tapers towards the center of the substantially circular pattern. In another embodiment, the sensor elements have a tapered shape, but are disposed in a ring configuration. The sensor elements form an outer sensing area of the ring configuration. The outer diameter of the sensor elements of the ring configuration is configured to be substantially aligned with the center of the conductive trace when the moveable object is in the known, center position. A button may be disposed in the inner sensing area of the ring of sensor elements. The button may be a mechanical button. Alternatively, the button may be a touch-sensor button, including an additional sensor element that is disposed in the inner sensing area. The additional sensor element is configured to detect the presence of the conductive object for purpose of determining a button activation.

In one embodiment, the sensor elements of the pointing device 280 are disposed in a first plane, such as a surface of a circuit board. The circuit board may be a printed circuit board (PCB) with conductive traces disposed on the surface of the PCB to form the sensor elements. In one embodiment, the sensor elements have a pie or wedge shape that tapers towards the center of the sensor array. Alternatively, other shapes may be used. A moveable object, having a portion of its surface be conductive, is disposed to move in a second plane that is substantially parallel to the first plane. In one embodiment, an insulating layer (e.g., solder mask, an Acrylonitrile butadiene styrene (ABS) sheet, or the like) is disposed between the first and second planes to insulate the conductive material of the moveable object and of the sensor elements.

In one embodiment, the pointing device includes a self-centering device that is coupled to the moveable object. The self-centering device is configured to center the moveable object to a known position after being moved. In one embodiment, the self-centering device comprises a spring mechanism, such as a circumferential linear spring, an O-ring of elastic material, a leaf spring, a tension-coil spring, a compression-coil spring, or the like. In one embodiment, the self-centering device includes a housing coupled to the moveable object and the circuit board, upon which the sensor elements are disposed. The spring mechanism is coupled between the housing and the moveable object, and is configured to return the moveable object to the known position after being moved by the user. In one embodiment, multiple posts are disposed to surround the outer circumference of the moveable object, and the spring mechanism is disposed around the posts. For example, an O-ring of elastic material is disposed to surround the outer circumference of the moveable object to provide a constant tension against the moveable object when at the zero position.

The electronic system 200 may include any combination of one or more of the touch-sensor pad 220, touch-sensor slider 230, touch-sensor button 240, and/or pointing device 280. In another embodiment, the electronic system 200 may also include non-capacitance sensor elements 270 coupled to the processing device 210 via bus 271. The non-capacitance sensor elements 270 may include buttons, light emitting diodes (LEDs), and other user interface devices, such as a mouse, a keyboard, a display, or other functional keys that do not require capacitance sensing. In one embodiment, buses 281, 271, 241, 231, and 221 may be a single bus. Alternatively, these buses may be configured into any combination of one or more separate buses.

The processing device 210 may also provide value-added functionality such as keyboard control integration, LEDs, battery charger, and general purpose I/O, as illustrated as non-capacitance sensor elements 270. Non-capacitance sensor elements 270 are coupled to the GPIO 207.

Processing device 210 may include internal oscillator/clocks 206 and communication block 208. The oscillator/clocks block 206 provides clock signals to one or more of the components of processing device 210. Communication block 208 may be used to communicate with an external component, such as a host processor 250, via host interface (I/F) 251. Alternatively, processing block 210 may also be coupled to embedded controller 260 to communicate with the external components, such as host 250. Interfacing to the host 250 can be through various methods. In one exemplary embodiment, interfacing with the host 250 may be done using a standard PS/2 interface to connect to an embedded controller 260, which in turn sends data to the host 250 via a low pin count (LPC) interface. In some instances, it may be beneficial for the processing device 210 to do both touch-sensor pad and keyboard control operations, thereby freeing up the embedded controller 260 for other housekeeping functions. In another exemplary embodiment, interfacing may be done using a universal serial bus (USB) interface directly coupled to the host 250 via host interface 251. Alternatively, the processing device 210 may communicate to external components, such as the host 250 using industry standard interfaces, such as USB, PS/2, inter-integrated circuit (I2C) bus, system packet interfaces (SPI), or the like. The host 250 and/or embedded controller 260 may be coupled to the processing device 210 with a ribbon or flex cable from an assembly, which houses the sensing device and processing device.

In one embodiment, the processing device 210 is configured to communicate with the embedded controller 260 or the host 250 to send and/or receive data. The data may be a command or alternatively a signal. In an exemplary embodiment, the electronic system 200 may operate in both standard-mouse compatible and enhanced modes. The standard-mouse compatible mode utilizes the HID class drivers already built into the Operating System (OS) software of host 250. These drivers enable the processing device 210 and sensing device to operate as a standard pointer control user interface device, such as a two-button PS/2 mouse. The enhanced mode may enable additional features such as scrolling or disabling the sensing device, such as when a mouse is plugged into the notebook. Alternatively, the processing device 210 may be configured to communicate with the embedded controller 260 or the host 250, using non-OS drivers, such as dedicated touch-sensor pad drivers, or other drivers known by those of ordinary skill in the art.

In one embodiment, the processing device 210 may operate to communicate data (e.g., commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers. It should also be noted that the host 250 may directly communicate with the processing device 210 via host interface 251.

In one embodiment, the data sent to the host 250 from the processing device 210 includes click, double-click, movement of the pointer, scroll-up, scroll-down, scroll-left, scroll-right, step Back, and step Forward. In another embodiment, the data sent to the host sent to the host 250 includes the position or location of the conductive object on the sensing device. Alternatively, other user interface device commands may be communicated to the host 250 from the processing device 210. For example, these commands may be based on gestures occurring on the sensing device that are recognized by the processing device, such as tap, push, hop, drag, and zigzag gestures. Alternatively, other commands may be recognized. Similarly, signals may be sent that indicate the recognition of these operations.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 may be the Programmable System on a Chip (PSoC®) processing device, developed by Cypress Semiconductor Corporation, San Jose, Calif. Alternatively, processing device 210 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

It should also be noted that the embodiments described herein are not limited to having a configuration of a processing device coupled to a host, but may include a system that measures the capacitance on the sensing device and sends the raw data to a host computer where it is analyzed by an application. In effect the processing that is done by processing device 210 may also be done in the host. In another embodiment, the processing device 210 is the host.

In one embodiment, the method and apparatus described herein may be implemented in a fully self-contained sensing device, which outputs fully processed x/y movement and gesture data signals or data commands to a host. In another embodiment, the method and apparatus may be implemented in a sensing device, which outputs x/y movement data and also finger presence data to a host, and where the host processes the received data to detect gestures. In another embodiment, the method and apparatus may be implemented in a sensing device, which outputs raw capacitance data to a host, where the host processes the capacitance data to compensate for quiescent and stray capacitance, and calculates x/y movement and detects gestures by processing the capacitance data. Alternatively, the method and apparatus may be implemented in a sensing device, which outputs pre-processed capacitance data to a host, where the sensing device processes the capacitance data to compensate for quiescent and stray capacitance, and the host calculates x/y movement and detects gestures from the pre-processed capacitance data. Alternatively, other configurations are possible.

The electronic system that includes the embodiments described herein may be implemented in a conventional laptop touch-sensor pad. Alternatively, it may be implemented in a wired or wireless keyboard integrating a touch-sensor pad, which is itself itself connected to a host. In such an implementation, the processing described above as being performed by the "host" may be performed in part or in whole by the keyboard controller, which may then pass fully processed, pre-processed or unprocessed data to the system host. In another embodiment, the embodiments may be implemented in a mobile handset (e.g., cellular or mobile phone) or other electronic devices.

Capacitance sensor 201 may be integrated into the processing device 210, or alternatively, in a separate IC. Alternatively, descriptions of capacitance sensor 201 may be generated and compiled for incorporation into other integrated circuits. For example, behavioral level code describing capacitance sensor 201, or portions thereof, may be generated using a hardware description language, such as VHDL or Verilog, and stored to a machine-accessible medium (e.g., Flash ROM, CD-ROM, hard disk, floppy disk, etc.). Furthermore, the behavioral level code can be compiled into a netlist, or even a circuit layout and stored to a machine-accessible medium. The behavioral level code, the netlist, and the circuit layout all represent various levels of abstraction to describe capacitance sensor 201.

It should be noted that the components of electronic system 200 may include all the components described above. Alternatively, electronic system 200 may include only some of the components described above, or include additional components not listed herein.

In one embodiment, electronic system 200 is implemented in a notebook computer. Alternatively, the electronic device may be used in other applications, such as a mobile handset, a PDA, a kiosk, a keyboard, a television, a remote control, a monitor, a handheld multi-media device, a handheld video player, a handheld gaming device, or a control panel.

In one embodiment, capacitance sensor 201 is a capacitance sensing relaxation oscillator (CSR). The CSR may be coupled to an array of sensor elements using a current-programmable relaxation oscillator, an analog multiplexer, digital counting functions, and high-level software routines to compensate for environmental and physical sensor element variations. The sensor array may include combinations of independent sensor elements, sliding sensor elements (e.g., touch-sensor slider), and touch-sensor sensor element pads (e.g., touch pad or touch screen) implemented as a pair of orthogonal sliding sensor elements. The CSR may include physical, electrical, and software components. The physical components may include the physical sensor element itself, typically a pattern constructed on a PCB with an insulating cover, a flexible membrane, or a transparent overlay. The electrical component may include an oscillator or other means to convert a capacitance into a measured value. The electrical component may also include a counter or timer to measure the oscillator output. The software component may include detection and compensation algorithms to convert the count value into a sensor element detection decision (also referred to as switch detection decision). For example, in the case of slider sensor elements or X-Y touch-sensor sensor element pads, a calculation for finding position of the conductive object to greater resolution than the physical pitch of the sensor elements may be used.

It should be noted that there are various known methods for measuring capacitance. Although some embodiments described herein are described using a relaxation oscillator, the present embodiments are not limited to using relaxation oscillators, but may oscillators, but may include other methods, such as current versus voltage phase shift measurement, resistor-capacitor charge timing, capacitive bridge divider, charge transfer, successive approximation, sigma-delta modulators, charge-accumulation circuits, or the like. It should be noted however, instead of evaluating the raw counts relative to a threshold, the capacitance sensor may be evaluating other measurements to determine the user interaction. For example, in the capacitance sensor having a sigma-delta modulator, the capacitance sensor is evaluating the ratio of pulse widths of the output, instead of the raw counts being over a certain threshold.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitance values may require very large resistors for reasonable timing. The capacitive bridge divider may include driving the capacitor under test through a fixed reference capacitor. The reference capacitor and the capacitor under test form a voltage divider. The voltage signal may be recovered with a synchronous demodulator, which may be done in the processing device 210. The charge transfer may be conceptually similar to an R-C charging circuit. In this method, $C_P$ is the capacitance being sensed. $C_{SUM}$ is the summing capacitor, into which charge is transferred on successive cycles. At the start of the measurement cycle, the voltage on $C_{SUM}$ is discharged. The voltage on $C_{SUM}$ increases exponentially (and only slightly) with each clock cycle. The time for this voltage to reach a specific threshold is measured with a counter. Additional details regarding these alternative counter. Additional details regarding these alternative embodiments have not been included so as to not obscure the present embodiments, and because these alternative embodiments for measuring capacitance are known by those of ordinary skill in the art.

Figure 3A:
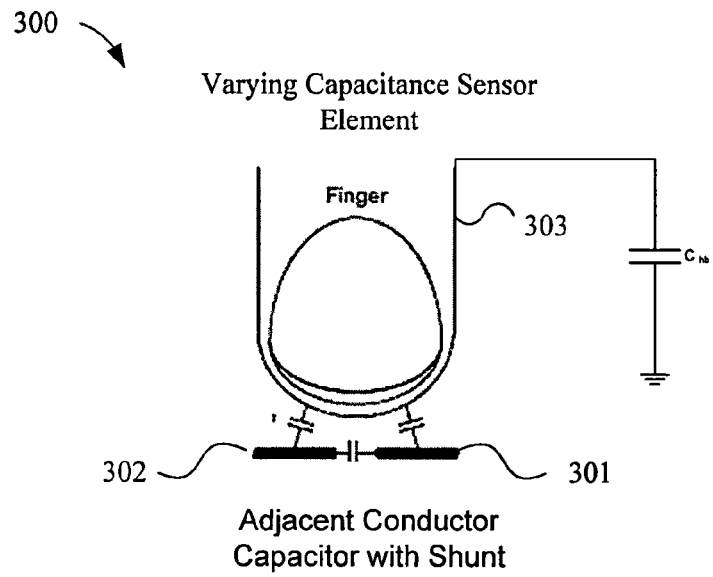
FIG. 3A illustrates a varying capacitance sensor element.

FIG. 3A illustrates a varying capacitance sensor element. In its basic form, a capacitance sensor element 300 is a pair of adjacent conductors 301 and 302. There is a small edge-to-edge capacitance, but the intent of sensor element layout is to minimize the parasitic capacitance $C_P$ between these conductors. When a conductive object 303 (e.g., finger) is placed in proximity to the two conductors 301 and 302, there is a capacitance between electrode 301 and the conductive object 303 and a similar capacitance between the conductive object 303 and the other electrode 302. The capacitance between the electrodes when no conductive object 303 is present is the base capacitance $C_P$ that may be stored as a baseline value. The capacitance value $C_F$ represents the capacitance from conductor 301 to conductive object 303 then to conductor 302. There is also a total capacitance ($C_P+C_F$) on the sensor element 300 when the conductive object 303 is present on or in close proximity to the sensor element 300. The baseline capacitance value $C_P$ may be subtracted from the total capacitance when the conductive object 303 is present to determine the change in capacitance (e.g., capacitance variation $C_F$) when the conductive object 303 is present and when the conductive object 303 is not present on the sensor element. Effectively, the capacitance variation $C_F$ can be measured to determine whether a conductive object 303 is present or not (e.g., sensor activation) on the sensor element 300. In the case of the finger as a conductive object, the conductive object is usually grounded via the human body's capacitance to ground. In this case, the conductive surface of the sensor element is physically and electrically isolated from the grounded human body connection. The $C_P$ isolated from the grounded human body connection. The $C_P$ connection can be modeled two different ways and may make a significant difference in sensitivity.

Capacitance sensor element 300 may be used in a capacitance sensor array. The capacitance sensor array is a set of capacitors where one side of each capacitor is connected to a system ground. When the capacitance sensor element 300 is used in the sensor array, when the conductor 301 is sensed, the conductor 302 is connected to ground, and when the conductor 302 is sensed, the conductor 301 is connected to ground. Alternatively, when the sensor element is used for a touch-sensor button, the sensor element is sensed and the sensed button area may be surrounded by a fixed ground. The presence of the conductive object 303 increases the capacitance ($C_P+C_F$) of the sensor element 300 to ground. Determining sensor element activation is then a matter of measuring change in the capacitance ($C_F$) or capacitance variation. Sensor element 300 is also known as a grounded variable capacitor.

The conductive object 303 in this embodiment has been illustrated as a finger. Alternatively, this technique may be applied to any conductive object, for example, a conductive door switch, position sensor, or conductive pen in a stylus tracking system (e.g., stylus).

Figure 3B:
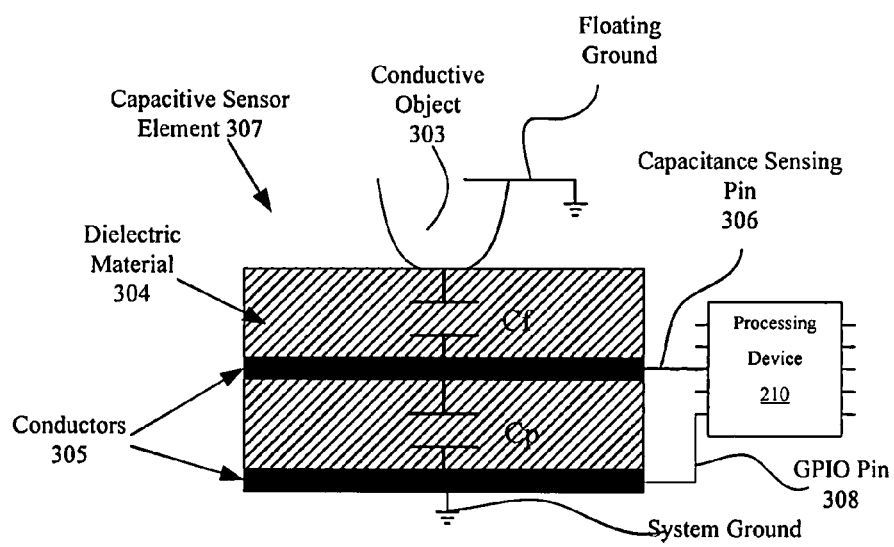
FIG. 3B illustrates one embodiment of a sensing device coupled to a processing device.

FIG. 3B illustrates one embodiment of a capacitance sensor element 307 coupled to a processing device 210. Capacitance sensor element 307 illustrates the capacitance as seen by the processing device 210 on the capacitance sensing pin 306. As described above, when a conductive object 303 (e.g., finger) is placed in proximity to one of the conductors 305, there is a capacitance, $C_F$, between the one of the conductors 305 and the conductive object 303 with respect to ground. This ground, however, may be a floating floating ground. Also, there is a capacitance, $C_P$, between the conductors 305, with one of the conductors 305 being connected to a system ground. The grounded conductor may be coupled to the processing device 210 using GPIO pin 308. The conductors 305 may be metal, or alternatively, the conductors may be conductive ink (e.g., carbon ink), conductive ceramic (e.g., transparent conductors of indium tin oxide (ITO)), conductive polymers, or the like. In one embodiment, the grounded conductor may be an adjacent sensor element that is grounded while the capacitance on the neighboring sensor element is measured. Alternatively, the grounded conductor may be other grounding mechanisms, such as a surrounding ground plane. Accordingly, the processing device 210 can measure the change in capacitance, capacitance variation $C_F$, as the conductive object is in proximity to one of the conductors 305. Above and below the conductor that is closest to the conductive object 303 is dielectric material 304. The dielectric material 304 above the conductor 305 can be an overlay. The overlay may be non-conductive material used to protect the circuitry from environmental conditions and electrostatic discharge (ESD), and to insulate the user's finger (e.g., conductive object) from the circuitry. Capacitance sensor element 307 may be a sensor element of a touch-sensor pad, a touch-sensor slider, or a touch-sensor button.

Figure 3C:
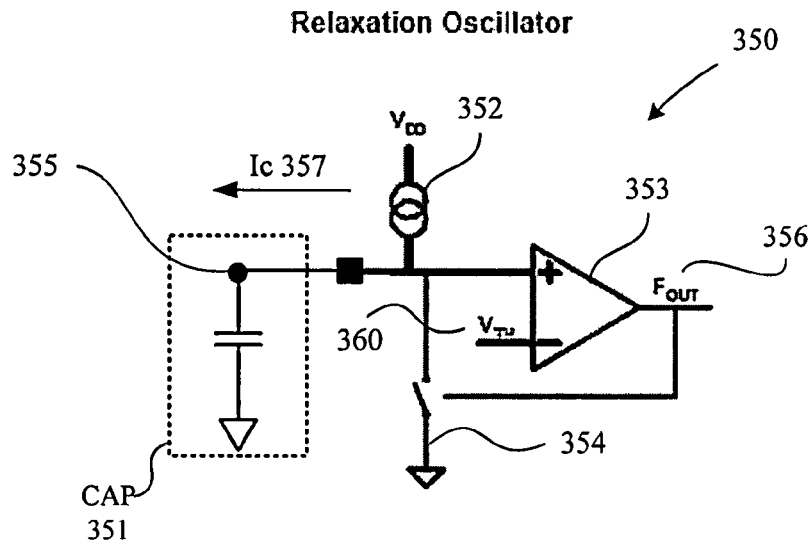
FIG. 3C illustrates one embodiment of a relaxation oscillator for measuring capacitance on a sensor element.

FIG. 3C illustrates one embodiment of a relaxation oscillator. The relaxation oscillator 350 is formed by the capacitance to be measured on capacitor 351, a charging current source 352, a comparator 353, and a reset switch 354 (also referred to as a discharge switch). It should be noted that capacitor 351 is representative of the capacitance measured on a sensor element of a sensor array. The relaxation oscillator is coupled to drive a charging current (Ic) 357 in a single direction onto a device under test ("DUT") capacitor, ("DUT") capacitor, capacitor 351. As the charging current accumulates charge on the capacitor 351, the voltage across the capacitor increases with time as a function of Ic 357 and its capacitance C. Equation (1) describes the relation between current, capacitance, voltage, and time for a charging capacitor.

$$CdV = I_C dt \qquad (1)$$

The relaxation oscillator begins by charging the capacitor 351, at a fixed current Ic 357, from a ground potential or zero voltage until the voltage across the capacitor 351 at node 355 reaches a reference voltage or threshold voltage, $V_{TH}$ 360. At the threshold voltage $V_{TH}$ 360, the relaxation oscillator allows the accumulated charge at node 355 to discharge (e.g., the capacitor 351 to "relax" back to the ground potential) and then the process repeats itself. In particular, the output of comparator 353 asserts a clock signal $F_{OUT}$ 356 (e.g., $F_{OUT}$ 356 goes high), which enables the reset switch 354. This discharges the capacitor at node 355 to ground and the charge cycle starts again. The relaxation oscillator outputs a relaxation oscillator clock signal ($F_{OUT}$ 356) having a frequency ($f_{RO}$) dependent upon capacitance C of the capacitor 351 and charging current Ic 357 of the form of equation (2).

$$f_{RO} = \frac{i}{C * V_{TH}} \qquad (2)$$

The comparator trip time of the comparator 353 and reset switch 354 add a fixed delay. The output of the comparator 353 is synchronized with a reference system clock to guarantee that the reset time is long enough to completely discharge capacitor 351. This sets a practical upper limit to the operating frequency. For example, if capacitance C of the capacitor 351 changes, then $f_{RO}$ changes proportionally according to Equation (2). By Equation (2). By comparing $f_{RO}$ of $F_{OUT}$ 356 against the frequency ($f_{REF}$) of a known reference system clock signal (REF CLK), the change in capacitance ΔC can be measured. This is typically done by counting the number (N)

of REF CLKs in an integer number of $f_{RO}$ periods and storing the result as a digital count ($n_{RO}$), as in equations (3) and (4).

$$n_{RO} = \frac{N * f_{REF}}{f_{RO}} \qquad (3)$$

$$n_{RO} = \frac{N * C * V_{TH}}{i}. \qquad (4)$$

In one embodiment, a frequency counter may be coupled to receive relaxation oscillator clock signal ($F_{OUT}$ 356) and continuously monitor the frequency, and output a signal indicative of the difference Δf between the current frequency and a stored value indicative of a baseline capacitance.

In one exemplary embodiment, the relaxation oscillator 350 may be built using a programmable timer (e.g., 555 timer) to implement the comparator 353 and reset switch 354. Alternatively, the relaxation oscillator 350 may be built using other circuitry. Relaxation oscillators are known by those of ordinary skill in the art, and accordingly, additional details regarding their operation have not been included so as to not obscure the present embodiments.

The capacitor charging current for the relaxation oscillator 350 may be generated in a register programmable current output DAC (also known as IDAC). Accordingly, the current source 352 may be a current DAC or IDAC. The IDAC output current may be set by an 8-bit value provided by the processing device 210, such as from the processing core 202. The 8-bit value may be stored in a register, in memory, or the like.

In many capacitance sensor element designs, the two "conductors" (e.g., 301 and 302) of the sensing capacitor are actually adjacent sensor elements that are electrically isolated (e.g., PCB pads or traces), as indicated in FIG. 3A. Typically, one of these conductors is connected to a system ground. Layouts for touch-sensor slider (e.g., linear slide sensor elements) and touch-sensor pad applications have sensor elements that may be immediately adjacent. In these cases, all of the sensor elements that are not active are connected to a system ground through the GPIO 207 of the processing device 210 dedicated to that pin. The actual capacitance between adjacent conductors is small ($C_P$), but the capacitance of the active conductor (and its PCB trace back to the processing device 210) to ground, when detecting the presence of the conductive object 303, may be considerably higher ($C_P + C_F$). The capacitance of two parallel conductors is given by the following equation:

$$C = \varepsilon_0 \cdot \varepsilon_R \cdot \frac{A}{d} = \varepsilon_R \cdot 8.85 \cdot \frac{A}{d} \text{ pF/m} \qquad (5)$$

The dimensions of equation (5) are in meters. This is a very simple model of the capacitance. The reality is that there are fringing effects that substantially increase the sensor element-to-ground (and PCB trace-to-ground) capacitance.

There is some variation of sensor element sensitivity as a result of environmental factors. A baseline update routine, which compensates for this variation, may be provided in the high-level APIs.

As described above with respect to the relaxation oscillator 350, when a finger or conductive object is placed on the sensor element, the capacitance increases from $C_P$ to $C_P + C_F$ so the relaxation oscillator output signal 356 ($F_{OUT}$) decreases in frequency. The relaxation oscillator output signal 356 ($F_{OUT}$) may be fed to a digital counter for measurement. There are two methods for counting the relaxation oscillator output signal 356: frequency measurement and period measurement. Additional details of the relaxation oscillator and digital counter are known by those of ordinary skill in the art, and accordingly a detailed description regarding them has not been included. It should also be noted, that the embodiments described herein are not limited to using relaxation oscillators, but may include other sensing circuitry for measuring capacitance, such as versus voltage phase shift measurement, resistor-capacitor charge timing, capacitive bridge divider, charge transfer, sigma-delta modulators, charge-accumulation circuits, or the like.

Figure 3D:
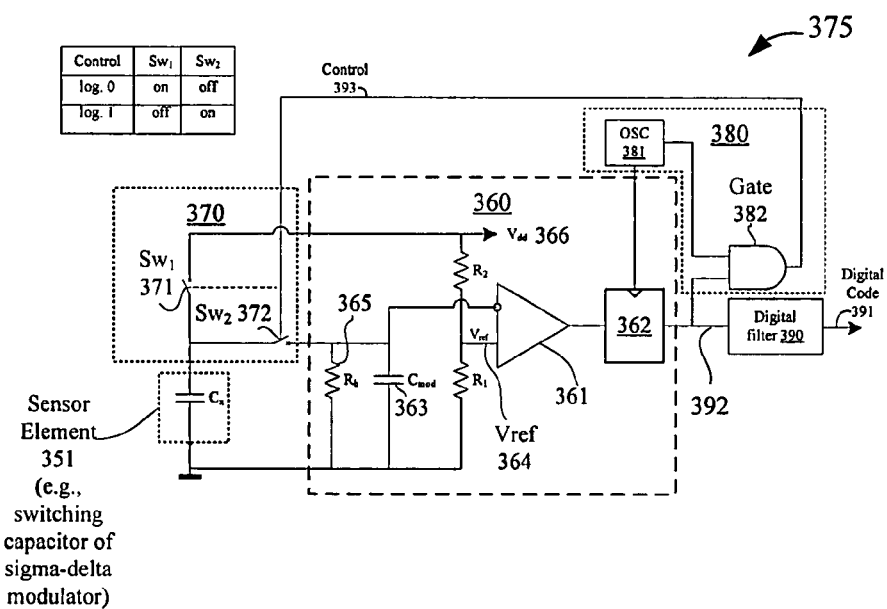
FIG. 3D illustrates a schematic of one embodiment of a circuit including a sigma-delta modulator and a digital filter for measuring capacitance on a sensor element.

FIG. 3D illustrates a schematic of one embodiment of a circuit 375 including a sigma-delta modulator 360 and a digital filter 390 for measuring capacitance on a sensor element 351. Circuit 375 includes a switching circuit 370, switching clock source 380, sigma-delta modulator 360, and digital filter 390 for measuring the capacitance on sensor element 351. Sensor element 351 may be a sensor element of a sensor array, and is represented as a switching capacitor $C_X$ in the modulator feedback loop. Alternatively, sensor element 351 may be a single sensor element, such as used in a touch-sensor button. Switching circuit 370 includes two switches $Sw_1$ 371 and $Sw_2$ 372. The switches $Sw_1$ 371 and $Sw_2$ 372 operate in two, non-overlapping phases (also known as break-before-make configuration). These switches together with sensing capacitor $C_x$ 351 form the switching 351 form the switching capacitor equivalent resistor, which provides the modulator capacitor $C_{mod}$ 363 of sigma-delta modulator 360 charge current (as illustrated in FIG. 3D) or discharge current (not illustrated) during one of the two phases.

The sigma-delta modulator 360 includes the comparator 361, latch 362, modulator capacitor $C_{mod}$ 363, modulator feedback resistor 365, which may also be referred to as bias resistor 365, and voltage source 366. The output of the comparator may be configured to toggle when the voltage on the modulator capacitor 363 crosses a reference voltage 364. The reference voltage 364 may be a pre-programmed value, and may be configured to be programmable. The sigma-delta modulator 360 also includes a latch 362 coupled to the output of the comparator 361 to latch the output of the comparator 361 for a given amount of time, and provide as an output, output 392. The latch may be configured to latch the output of the comparator based on a clock signal from the gate circuit 382 (e.g., oscillator signal from the oscillator 381). In another embodiment, the sigma-delta modulator 360 includes a synchronized latch that operates to latch an output of the comparator for a pre-determined length of time. The output of the comparator may be latched for measuring or sampling the output signal of the comparator 361 by the digital filter 390.

Sigma-delta modulator 360 is configured to keep the voltage on the modulator capacitor 363 close to reference voltage $V_{ref}$ 364 by alternatively connecting the switching capacitor resistor (e.g., switches $Sw_1$ 371 and $Sw_2$ 372 and sensing capacitor $C_x$ 351) to the modulator capacitor 363. The output 392 of the sigma-delta modulator 360 (e.g., output of latch 362) is feedback to the switching clock circuit 380, which controls the timing of the switching operations of switches $Sw_1$ 371 and $Sw_2$ 372 of switching circuit 370. For of switching circuit 370. For example, in this embodiment, the switching clock circuit 380 includes an oscillator 381 and gate 382. Alternatively, the switching clock circuit 380 may include a clock source, such as a spread spectrum clock source (e.g., pseudo-random signal (PRS)), a frequency divider, a pulse width modulator (PWM), or the like. The output 392 of the sigma-delta modulator 360 is used with an oscillator signal to gate a control signal 393, which switches the switches $Sw_1$ 371 and $Sw_2$ 372 in a non-overlapping manner (e.g., two, non-overlapping phases). The output 392 of the sigma-delta modulator 360 is also output to digital filter 390, which filters and/or converts the output into the digital code 391.

In one embodiment of the method of operation, at power on, the modulator capacitor 363 has zero voltage and switching capacitor resistor (formed by sensing capacitor Cx 351, and switches $Sw_1$ 371 and $Sw_2$ 372) is connected between Vdd line 366 and modulator capacitor 363. This connection allows the voltage on the modulator capacitor 363 to rise. When this voltage reaches the comparator reference voltage, $V_{ref}$ 364, the comparator 361 toggles and gates the control signal 393 of the switches $Sw_1$ 371 and $Sw_2$ 372, stopping the charge current. Because the current via bias resistors $R_b$ 365 continues to flow, the voltage on modulator capacitor 363 starts dropping. When it drops below the reference voltage 364, the output of the comparator 361 switches again, enabling the modulator capacitor 363 to start charging. The latch 362 and the comparator 361 set the sample frequency of the sigma-delta modulator 360.

The digital filter 390 is coupled to receive the output 392 of the sigma-delta modulator 360. The output 392 of the sigma-delta modulator 360 may be a single bit bit-stream, which can be filtered and/or converted to numerical values using a digital filter 390. filter 390. In one embodiment, the digital filter 390 is a counter. In another embodiment, the standard Sinc digital filter can be used. In another embodiment, the digital filter is a decimator. Alternatively, other digital filters may be used for filtering and/or converting the output 392 of the sigma-delta modulator 360 to provide the digital code 391. It should also be noted that the output 392 may be output to the decision logic 402 or other components of the processing device 210, or to the decision logic 451 or other components of the host 250 to process the bitstream output of the sigma-delta modulator 360.

Described below are the mathematical equations that represent the operations of FIG. 3D. During a normal operation mode, the sigma-delta modulator 360 keeps these currents substantially equal on average by keeping the voltage on the modulator 363 equal to, or close to, the reference voltage $V_{ref}$ 364. The current of the bias resistor $R_b$ 365 is:

$$I_{Rb} = \frac{V_{cmod}}{R_b} \quad (6)$$

The sensing capacitor $C_x$ 351 in the switched-capacitor mode has equivalent resistance:

$$R_c = \frac{1}{f_s C_x} \quad (7)$$

where $f_s$ is the operation frequency of the switches (e.g., switching circuit 370). If the output 392 of the sigma-delta modulator 360 has a duty cycle of $d_{mod}$, the average current of the switching capacitor 351 can be expressed in the following equation (8):

$$I_c = d_{mod} \frac{V_{dd} - V_{Cmod}}{R_c} \quad (8)$$

In the operation mode, $$I_{Rb} = I_c, V_{Cmod} = V_{ref} \text{ or} : \frac{V_{ref}}{R_b} = d_{mod} \frac{V_{dd} - V_{ref}}{R_c} \quad (9)$$

or taking into account that the reference voltage 364 is part of supply voltage:

$$V_{ref} = k_d V_{dd}; k_d = \frac{R_1}{R_1 + R_2} \quad (10)$$

The Equation (9) can be rewritten in the following form:

$$d_{mod} = \frac{R_c}{R_b} \frac{k_d}{1 - k_d} = \frac{1}{f_s R_b} \frac{k_d}{1 - k_d} \frac{1}{C_x} \quad (11)$$

The Equation (11) determines the minimum sensing capacitance value, which can be measured with the proposed method at given parameters set:

$$d_{mod} \leq 1, \text{ or} : C_{xmin} = \frac{1}{f_s R_b} \frac{k_d}{1 - k_d} \quad (12)$$

The resolution of this method may be determined by the sigma-delta modulator duty cycle measurement resolution, which is represented in the following equations:

$$\Delta d_{mod} = \beta \frac{\Delta C_x}{C_x^2};$$

$$\beta = \frac{1}{f_s R_b} \frac{k_d}{1 - k_d} \quad (13)$$

or after rewriting relatively $\Delta C_x$, we obtain:

$$\Delta C_x = \frac{1}{\beta} \Delta d_{mod} C_x^2 \quad (14)$$

In one exemplary embodiment, the resistance of the bias resistor 365 is 20 k ohms ($R_b$=20 k), the operation frequency of the switches is 12 MHz ($f_s$=12 MHz), the capacitance on the switching capacitor 351 is 15 picofarads ($C_x$=15 pF), and the ratio between Vdd 366 and the voltage reference 364 is 0.25 ($k_d$=0.25), the duty cycle has a 12-bit resolution and the capacitance resolution is 0.036 pF.

In some embodiments of capacitive sensing applications, it may be important to get fast data measurements. For example, the modulator can operate at sample frequency 10 MHz (period is 0.1 microseconds (μs)), for the 12-bit resolution sample, and digital filter as single-type integrator/counter the measurement time is approximately 410 μs (e.g., $2^{12}*0.1$ μs=410 μs). For faster measurement speeds at same resolutions, other types of digital filters may be used, for example, by using the Sinc2 filter, the scanning time at the same resolution may be reduced approximately 4 times. Using this configuration, the sensing method should have suitable measurement speed. A good measurement rate may be accomplished by using a double integrator as the digital filter 390.

Figure 4:
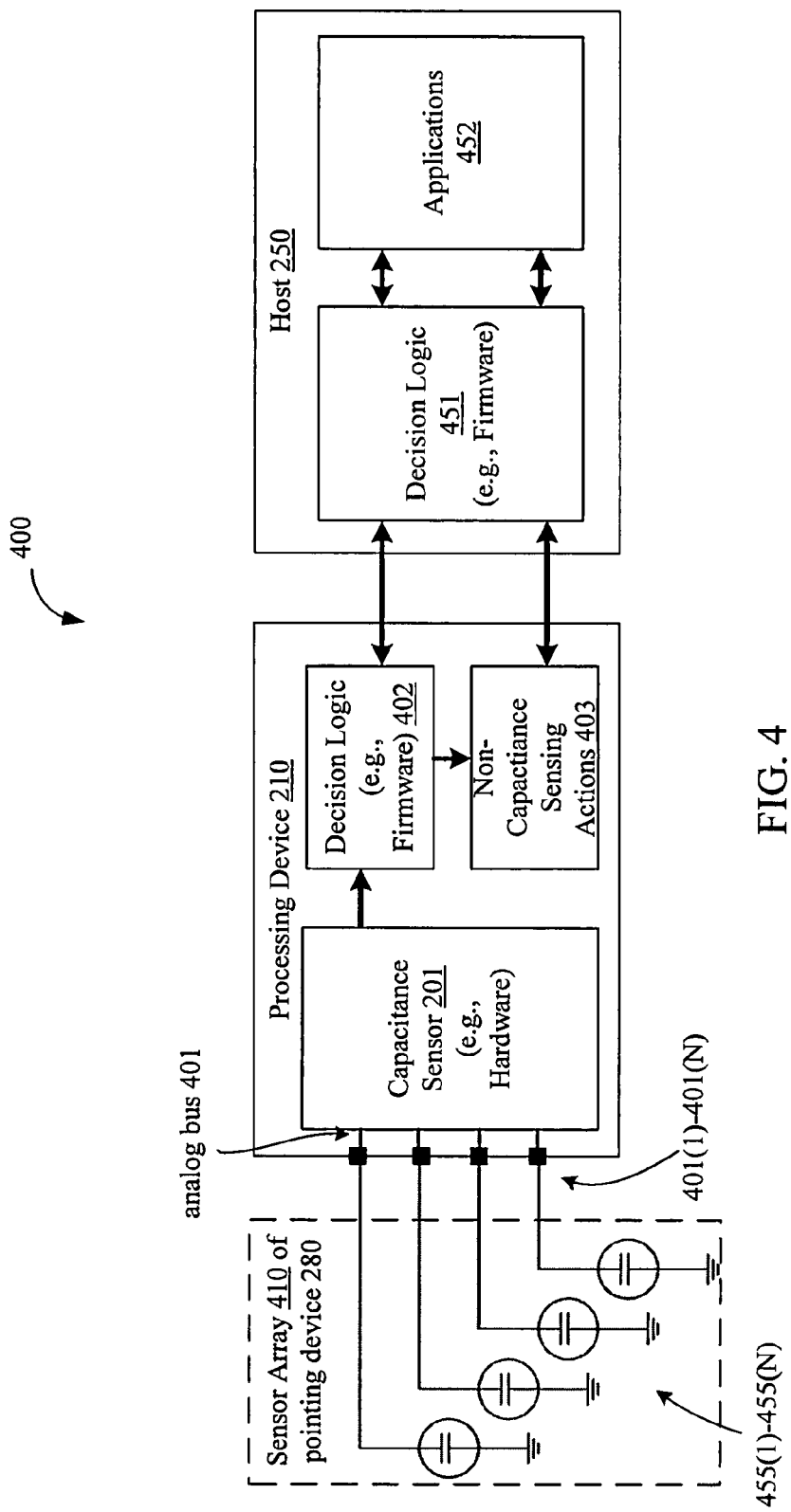
FIG. 4 illustrates a block diagram of one embodiment of an electronic device including a processing device that includes a capacitance sensor for measuring the capacitance on a sensor array.

FIG. 4 illustrates a block diagram of one embodiment of an electronic device 400 including a processing device 210 that includes a capacitance sensor 201 for measuring the capacitance on a sensor array 410 of the pointing device 280. The electronic device 400 includes the sensor array 410, which includes multiple touch-sensor buttons (e.g., similar to touch-sensor buttons 240 of FIG. 2), processing device 210, and host 250. The sensor array 410 is coupled to processing device 210 via an analog bus 401 having multiple pins 401(1)-401(N). Each sensor element is represented as a capacitor, as described above with respect to FIG. 3B. Sensor array 410 includes sensor elements 455(1)-455(N), where N is a positive integer value that represents the number of sensor elements of the sensor array 410.

In one embodiment, the capacitance sensor 201 includes a selection circuit (not illustrated). The selection circuit is coupled to the sensor elements 455(1)-455(N) and the sensing circuitry of the capacitance sensor 201. Selection circuit may be used to allow the capacitance sensor to measure capacitance on multiple sensor elements. The selection circuit may be configured to sequentially select a sensor element of the multiple sensor elements to provide the charge current and to measure the capacitance of each sensor element. In one exemplary embodiment, the selection circuit is a multiplexer array. Alternatively, the selection circuit may be other circuitry inside or outside the capacitance sensor 201 to select the sensor element to be measured. In another embodiment, one capacitance sensor 201 is used to measure capacitance on all or less than all of the sensor elements of the sensor array 410. Alternatively, multiple capacitance sensors 201 may be used to measure capacitance on the sensor elements of the sensor array. The multiplexer array may also be used to connect the sensor elements that are not being measured to the system ground. This may be done in conjunction with a dedicated pin in the GP10 port 207.

In another embodiment, the capacitance sensor 201 may be configured to simultaneously sense the sensor elements, as opposed to being configured to sequentially scan the sensor elements as described above.

In one embodiment, the processing device 210 further includes a decision logic block 402. The operations of decision logic block 402 may be implemented in firmware; alternatively, it may be implemented in hardware or software. The decision logic block 402 may be configured to receive the digital code or counts from the capacitance sensor 201, and to determine the state of the sensor array 410, such as whether a conductive whether a conductive object is detected on or in proximity to the sensor array 410, whether a conductive object is detected on the sensor array, where the conductive object was detected on the sensor array (e.g., determining the X-, Y-coordinates of the presence of the conductive object), determining absolute or relative position of the conductive object, whether the conductive object is performing a pointer operation, whether a gesture has been recognized on the sensor array 410 (e.g., click, double-click, movement of the pointer, scroll-up, scroll-down, scroll-left, scroll-right, step Back, step Forward, tap, push, hop, zigzag gestures, or the like), the deflection of the moveable conductive object, or the like.

In another embodiment, instead of performing the operations of the decision logic 402 in the processing device 210, the processing device 201 may send the raw data to the host 250, as described above. Host 250, as illustrated in FIGS. 4A and 4B, may include decision logic 451. The operations of decision logic 451 may also be implemented in firmware, hardware, and/or software. Also, as described above, the host may include high-level APIs in applications 452 that perform routines on the received data, such as compensating for sensitivity differences, other compensation algorithms, baseline update routines, start-up and/or initialization routines, interpolations operations, scaling operations, or the like. The operations described with respect to the decision logic 402 may be implemented in decision logic 451, applications 452, or in other hardware, software, and/or firmware external to the processing device 210.

In another embodiment, the processing device 210 may also include a non-capacitance sensing actions block 403. This block may be used to process and/or receive/transmit data to and from the host 250. For example, additional components may be be implemented to operate with the processing device 210 along with the sensor array 410 (e.g., keyboard, keypad, mouse, trackball, LEDs, displays, or the like).

At startup (or boot) the sensor elements (e.g., capacitors 455(1)-(N)) are scanned and the digital code or count values for each sensor element with no activation are stored as a baseline array ($C_P$). The presence of a finger on the sensor element or in proximity to the sensor element is determined by the difference in counts between a stored value for no sensor element activation and the acquired value with sensor element activation, referred to here as $\Delta n$. The sensitivity of a single sensor element is approximately:

$$\frac{\Delta n}{n} = \frac{C_F}{C_P} \tag{14}$$

The value of $\Delta n$ should be large enough for reasonable resolution and clear indication of sensor element activation (e.g., button activation). This drives sensor element construction decisions. $C_F$ should be as large a fraction of $C_P$ as possible. Since $C_F$ is determined by finger area and distance from the finger to the sensor element's conductive traces (through the over-lying insulator), the baseline capacitance $C_P$ should be minimized. The baseline capacitance $C_P$ includes the capacitance of the sensor element pad plus any parasitics, including routing and chip pin capacitance.

Figure 5:
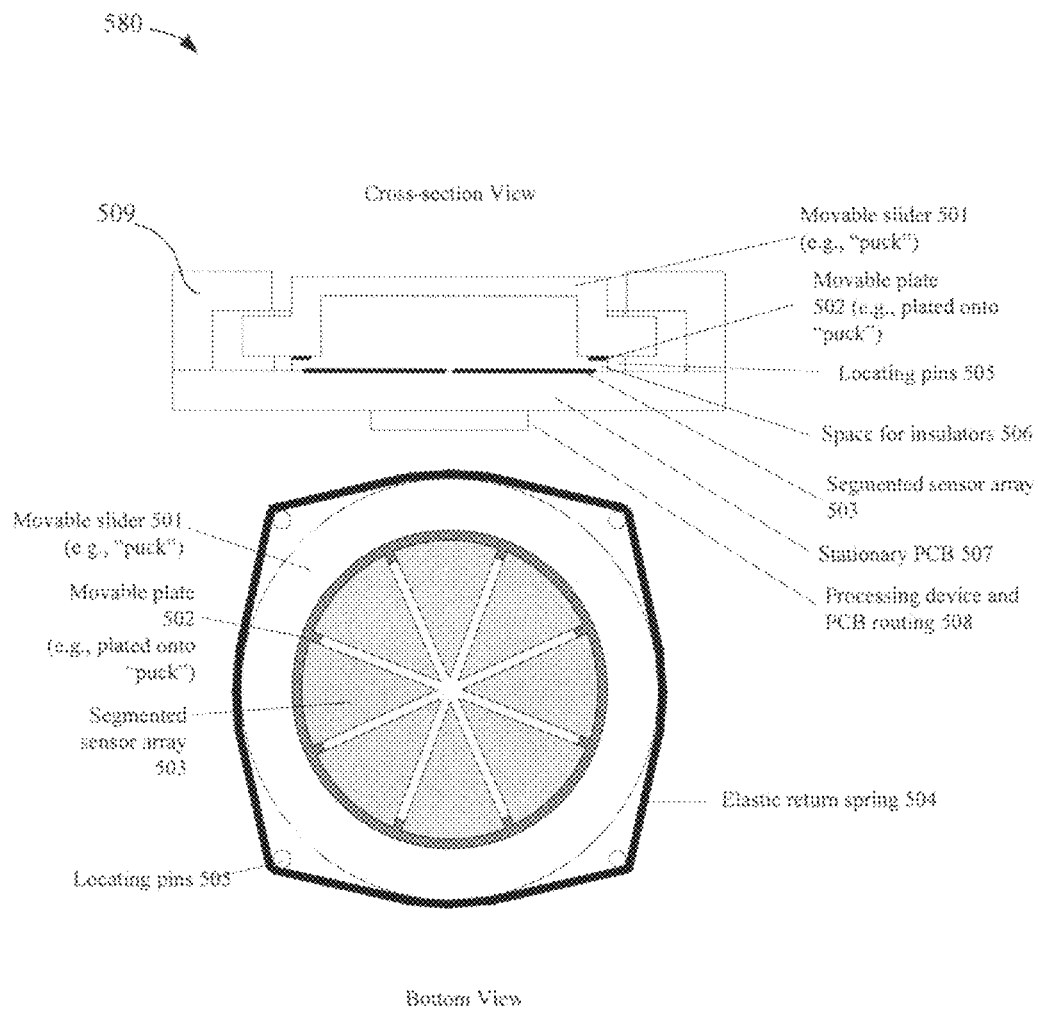
FIG. 5 illustrates a pointing device according to one embodiment of the present invention.

FIG. 5 illustrates a pointing device 580 according to one embodiment of the present invention. The pointing device 580 includes a segmented sensor array 503 fabricated on a stationary PCB 507. The processing device (e.g., 210) and corresponding PCB routing (e.g., conductive traces) 508 may be disposed on one side of the stationary PCB 507, for example, the processing device and PCB routing 508 is disposed on the opposite side of the opposite side of the stationary PCB 507 than the segmented sensor array 503. The pointing device 580 also includes a housing 509 coupled to the stationary PCB 507. Within the housing 509 is disposed a movable slider (e.g., puck) 501, which is a moveable conductive object that is configured to move in a plane that is parallel to the plane in which the segmented sensor array 503 is disposed.

The movable slider 501 includes a conductive surface on at least a portion of the movable slider 501; for example, the movable slider 501 includes a conductive plate 502 that moves with the movable slider 501. In one embodiment, the conductive plate 502 is a circular conductive trace that is aligned with an outer diameter of the segmented sensor array 503. In another embodiment, the conductive plate 502 is a conductive strip plated onto the movable slider 501, and the outer diameter of the sensor array 503 is aligned with the center of the conductive strip of the moveable slider 501. Alternatively the conductive plate 502 is aligned with an inner diameter of the segmented sensor array 503. In another embodiment, the moveable slider 501 is fabricated with conductive material.

In the embodiment illustrated in FIG. 5, the segmented sensor array 503 is a circular slider having multiple sensor elements disposed in a circular pattern. The sensor elements are disposed in a substantially circular pattern, and have a tapered shape that tapers towards the center of the substantially circular pattern, such as illustrated in FIG. 5A. In another embodiment, the segmented sensor array 503 includes multiple sensor elements disposed in a ring configuration. In this embodiment, the sensor elements form an outer-sensing area, and although the sensor elements are tapered towards the center of the ring configuration, the sensor elements do not taper all the way to the center of the ring to the center of the ring configuration, but includes an inner sensing area in which a button may be disposed. The button may be a mechanical button, or alternatively, the button may be an additional sensor element upon which the presence of a conductive object may be detected for button activation. Alternatively, the segmented sensor array 503 may includes multiple sensor elements disposed in other linear or non-linear manners.

In one embodiment, the moveable slider 501 and plate 502 are fabricated on a PCB for ease of guaranteeing dimensional stability. Alternatively, the moveable slider 501 and plate 502 may be other types of materials. Between the conductive plate 502 and the sensor elements of the sensor array 503 is a space 506 for insulators. In one embodiment, the insulating layer between the sensor array 503 and the moveable conductive plate 502 is a solder mask, such as used in PCB fabrication. In another embodiment, the pointing device 280 uses a very thin insulating separator of a more durable type, such as an ABS sheet, commonly used for labels, disposed in the space 506.

In one embodiment, the moveable slider 501 is a moveable puck-shaped object. In other embodiments, different shapes may be used, for example, in one embodiment a solid disk may be used as the moveable slider 501. The moveable slider may be other types of moveable objects having various shapes. In one embodiment, the moveable object is a circuit board having a conductive trace disposed thereon for the moveable conductive plate 502. In another embodiment, the moveable object is a solid disk having a conductive trace disposed thereon for the moveable conductive plate 502. In another embodiment, the moveable object is a ring having a conductive trace disposed thereon. The moveable conductive plate 502 may be a ring of conductive material that is disposed on the disposed on the moveable slider 501. Alternatively, the moveable conductive plate 502 is a conductive strip or conductive trace that is plated or otherwise disposed onto the surface of the moveable slider 501. Alternatively, other shapes may be used for the moveable slider 501 and/or the moveable conductive plate 502.

In one embodiment, the movable plate 502 is disposed with the segmented sensor array so that the outer-diameter of the segmented sensor array is aligned at the center of the movable plate 502, for a known position, for example, "zero" position. The pointing device 580 also includes a self-centering device that is coupled to the movable slider 501 to center the movable slider 501 to the known, zero position after being moved. In this embodiment, the self-centering device includes locating pins 505 and elastic return spring 504. The elastic return spring 504 is disposed around the locating pins 505 and the movable slider 501. As a user moves the movable slider 501 away from the known, zero position, the self-centering device automatically returns the movable slider 501 back to the known, zero position. In another embodiment, the self-centering device includes a spring mechanism coupled between the housing 509 and the movable slider 501. In another embodiment, multiple posts may be disposed to surround the outer circumference of the movable slider 501 and the spring mechanism is circumferential linear spring disposed around the posts, for example, the circumferential linear spring is stretched over the posts and the outside of the moveable slider 501 to hold the moveable slider 501 in the zero position by the circumferential linear spring. The spring may be fabricated from an elastic material; for example, an O-ring of suitable dimensions that is disposed around the posts and the moveable slider 501. Since the spring (i.e., O-ring) is a single piece, the spring mechanism may provide constant tension when at the zero position. In other embodiments, the spring mechanism may be, for example, a leaf spring, a tension-coil spring, a compression-coil spring, or the like.

The pointing device 580 is coupled to the processing device 210 by way of conductive traces. For example, each of the sensor elements of the sensor array 503 are coupled to a pin of the processing device 210, as described herein. The processing device is configured to receive multiple signals from the sensor array (e.g., from each of the sensor elements) and to determined a deflection of a movable conductive plate 502 that is moved over the sensor array 503. As described above the sensor array may be disposed in the first plane of the circuit board and the movable conductive plate 502 is moved in a second plane that is substantially parallel to the first plane. The conductive plate 502 and the sensor elements of the sensor array 503 are insulated by an insulating layer, for example, a solder mask or an ABS sheet. In one embodiment, the housing 509, the circuit board 507, and the movable slider 501 are disposed in a joystick. The processing device 210 may also disposed in the joystick, or alternatively, remotely from the joystick. In one embodiment, the joystick is implemented in a keyboard of a laptop computer. Alternatively, the joystick may be implemented as a user interface device in other devices.

The embodiments described herein may provide an advantage of having an integrated user interface that determines deflection of the moveable conductive object that can be implemented in a smaller area (e.g., desk area or surface area of a device) than conventional user interfaces. For example, the embodiments described herein may be implemented as a joystick on a keyboard of a laptop computer, and using the embodiments described herein, the surface area used on the laptop computer for the joystick may be joystick may be reduced, as compared to conventional user interfaces. For example, the typical force-sensing joystick for use in a laptop computer is located within the keyboard, and may have an exposed diameter of 0.5 to 0.6 cm (through the keyboard), an underlying area of 1.5 to 2.0 cm on the board, and a height of as much as 2 cm, most of which is below the contact level of the keyboard. In contrast, using the embodiments described herein, a capacitance sensing joystick may be fabricated to have a surface area less than approximately 2.5 cm in diameter, which is slightly larger than a human finger, and less than 0.5 cm in thickness. Alternatively, the capacitance sensing joystick may include other values. It should be noted that having larger dimensions for the capacitance sensing joystick may offer improvements in signal quality.

In the zero position, the capacitance from each sensor of the sensor array 503 to the movable, conductive plate 502 is nominally equal. When pushed to one side, the movable plate 502 covers less of the sensor element on that side, reducing the capacitance from the sensor element to the plate 502. The movable plate 502 covers more of the sensor element on the opposite side, increasing the capacitance from that sensor element to the plate 502. It should be noted that sensor elements of the sensor array 503 that are not in the direction of the movement have relatively little change in capacitance value. The overlap of the conductive plate 502 and sensor elements at zero and at fully deflected positions 601 and 602 are illustrated and described with respect to FIGS. 6A and 6B.

Pushing the moveable slider 501 to one side puts tension on the O-ring (e.g., elastic return spring 504). When the moveable slider 501 is released, the tension restores the moveable slider 501 to the zero position.

Figure 6:
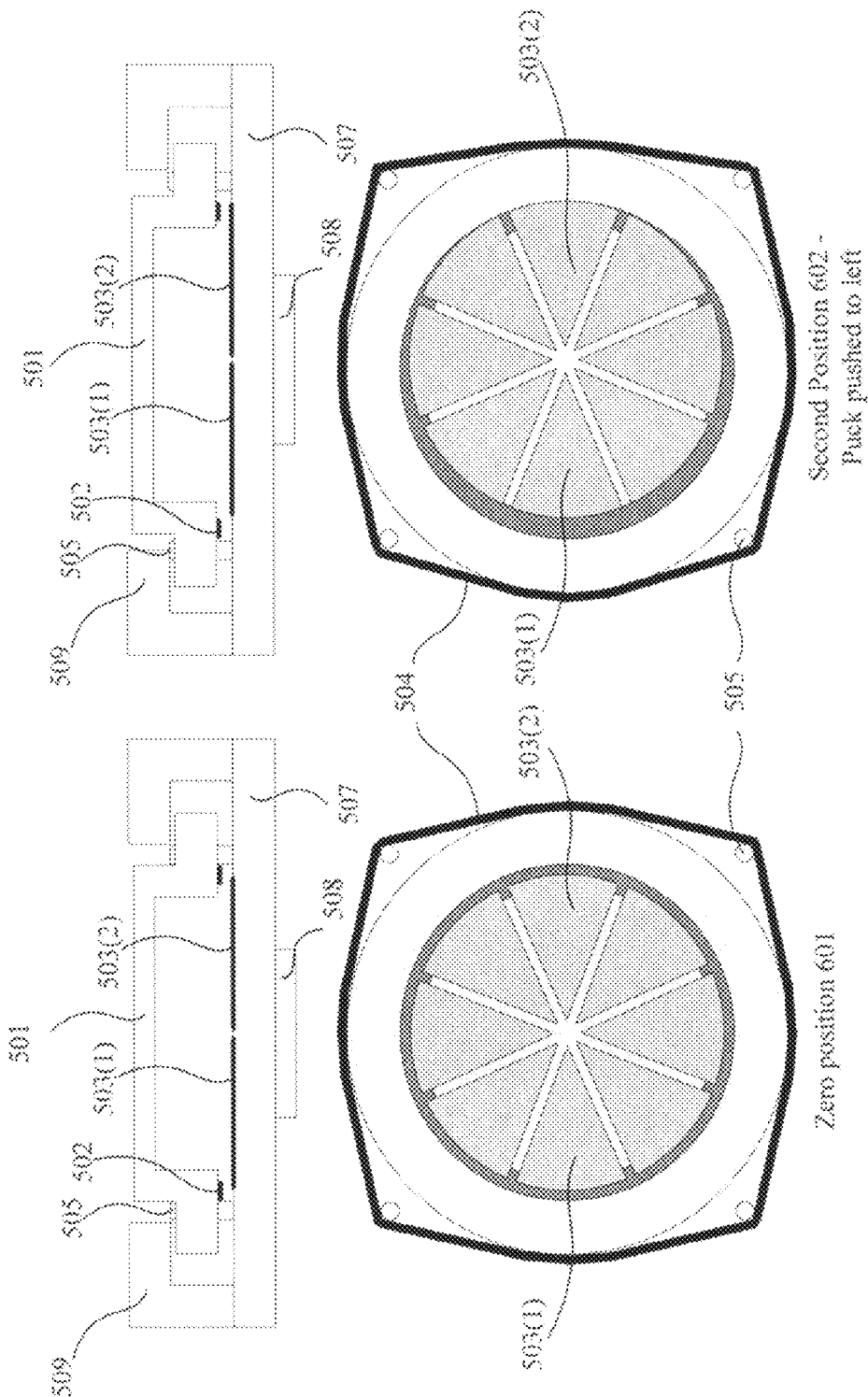
FIG. 6A illustrates an overlap of the moveable conductive object and the sensor elements of the pointing device at a zero position according to one embodiment of the present invention.
FIG. 6B illustrates an overlap of the moveable conductive object and the sensor elements of the pointing device at a fully-deflected position according to one embodiment of the present invention.
Figure 7:
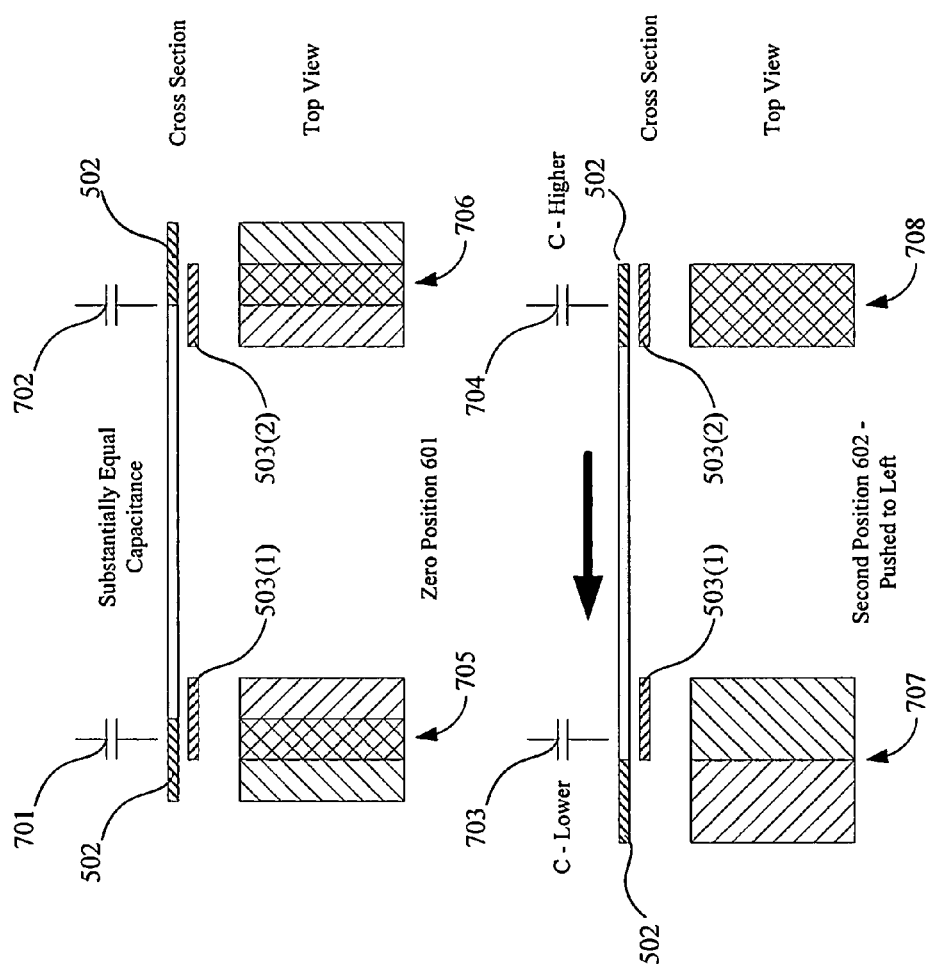
FIG. 7 illustrates a simplified model showing the capacitive change on the sensor elements between zero deflection and full deflection.

FIG. 7 illustrates a simplified model showing the capacitive change on the sensors between zero deflection and full deflection, as illustrated in FIGS. 6A and 6B. The capacitance of two parallel plates (e.g., moveable conductive plate 502 and one of the sensor elements 503(1) of the sensor array) is proportional to the co-incident area (e.g., overlapping surface area) of the conductive plates. At zero deflection, the capacitances 701 and 702 of sensor elements 503(1) and 503(2) of opposite sides are substantially equal. At full deflection, one capacitance value 704 doubles and the capacitance 703 on the opposite side drops nearly to zero. Fringing effects and parasitics add static capacitance to all sensor elements; however, the PCB may be designed to balance these capacitances. As illustrated in FIG. 7, at zero deflection, the overlapping area 705 between the moveable conductive plate 502 and the sensor element 503(1) is substantially equal to the overlapping area 706 between the conductive plate 502 and the sensor element of 503(2). At full deflection, in this case, pushed to the left at position 602, the overlapping area 708 between the moveable conductive plate 502 and the sensor element 503(1) is greater than the overlapping area 707 between the conductive plate 502 and the sensor element of 503(2). It should be noted that although the embodiments above have been described with respect to overlapping area of the sensor elements 503(1) and 503(2) with the moveable conductive plate 502, the overlapping area may be applicable to other sensor elements of the sensor array 503, such as a deflection that results in the moveable slider 501 being pushed up and to the left, to the right, or the like.

In one embodiment, the capacitance of each of the sensor elements to the moveable conductive plate 502 is measured sequentially. The sensor elements not being measured may be connected to ground, or alternatively, a grounding plate may be disposed to disposed to surround each sensor element or to surround the entire sensor array. The grounded sensor elements or grounding plate provides a return path to the processing device 210 for the movable plate 502 as one side of the capacitor. The capacitance can be readily measured using any one of several techniques which can be implemented in processing device such as the PSoC® microcontroller manufactured by Cypress Semiconductor Corp of San Jose, Calif. Alternatively, other processing devices may be used. The techniques for measuring the capacitance may be, for example, relaxation oscillator, charge transfer, charge accumulation, successive approximation, sigma-delta modulation, or the like.

The capacitances of the sensor elements (8 in this example) are used to calculate a direction of deflection and a magnitude of deflection. The moveable conductive plate 502 is moved over the sensor array 503, and the processing device 210 is configured to determine a deflection of the moveable conductive object 502, including the deflection magnitude and/or deflection direction. The calculation may be done to determine vectors of the deflection, for example, expressed in terms of x- and y-directions, or alternatively, in terms of a radius, r, and angle, theta. The processing device 210 may use the capacitances to compute a two-sided centroid. In one embodiment, the positive (or maximum) centroid of a line array with k elements and a measure count on each sensor elements, nk, as expressed in the following equation (15):

$$Cent_{POS} = \frac{\sum n_k * k}{\sum n_k} \quad (15)$$

The negative (or minimum) centroid of a line array with k elements is calculated by finding the difference between nk for each element and the maximum value of nk, as expressed in the following equation (16):

$$Cent_{NEG} = \frac{\sum (\max(n_k) - n_k) * k}{\sum (\max(n_k) - n_k)} \quad (16)$$

In one embodiment, computing the two-sided centroid includes computing a minimum centroid and a maximum centroid (e.g., peak value), and combining the minimum and maximum centroids to compute the deflection magnitude and direction. The combining of the minimum and maximum centroids may result in a more accurate measurement of the deflection magnitude and direction. It should be noted that the conversion to standard reporting methods of a force sensor, touch sensor pad, or mouse is easily implemented in the processing device 210. Alternatively, the centroids may be calculated using other equations. Also, the centroids may be calculated along a circular array, instead of a linear array. The centroid calculations in a circular array may be a simple matter of algebraically wrapping the line around the circle. The alternative centroid calculations, including centroid calculations along a circular array, are known to those of ordinary skill in the art, and accordingly, have not been included so as to not obscure the embodiments of the present invention.

In another embodiment, a first capacitance and a second capacitance on a first sensor element and a second element are measured, respectively, while the moveable conductive object is located in a known position relative to the first and second sensor elements. These capacitances may be baseline measurements of the first and second sensor sensor elements. Next, a third capacitance and a fourth capacitance are measured on the first and second sensor elements, respectively, while the moveable conductive object is located in a second position, such as partially-deflected or fully-deflected positions. The deflection is determined based on the first, second, third, and fourth capacitances measured on the first and second sensor elements at the respective positions. For example, in one embodiment, a magnitude and direction vector that is representative of the change in capacitance on the first and second sensor elements from the known position to the second position is computed to determine the deflection. As described above, the moveable conductive object is automatically centered to the known position after the moveable conductive object is moved from the known position to the second position by the user.

There are several alternatives for construction of the sensor array of sensor elements. For example, the sensor elements may be pie or wedge shaped extending from the center point (e.g., tapered completely to the center). In an alternative embodiment, the sensor elements may be fabricated in a ring configuration where the center of conductor on the movable plate is aligned with the outside of the sensor ring. The sensor elements may be pie or wedge shaped tapered partially to the center from the outer circumference of the sensor array. In another embodiment, the sensor elements may be fabricated in a ring configuration where the center of the conductor on the movable plate is aligned with the inside of the sensor ring. The ring configuration may enable the addition of a separate center switch or button. The button may be a mechanical button, or alternatively, an additional sensor element may be disposed in the inner sensing area.

An alternative embodiment is to use the switch in a single axis, with the movable conductor in a fixed track, with a spring-loaded return in the same axis. This embodiment can use multiple sensor elements in a line typically in the pattern of FIG. 1A. A centroid is calculated in the manner described above.

A common usage of a mouse or a touch sensor pad is location, then button-press indication. In one embodiment, location and button-press activation is determined using the pointing device 880, illustrated in FIG. 8.

Figure 8:
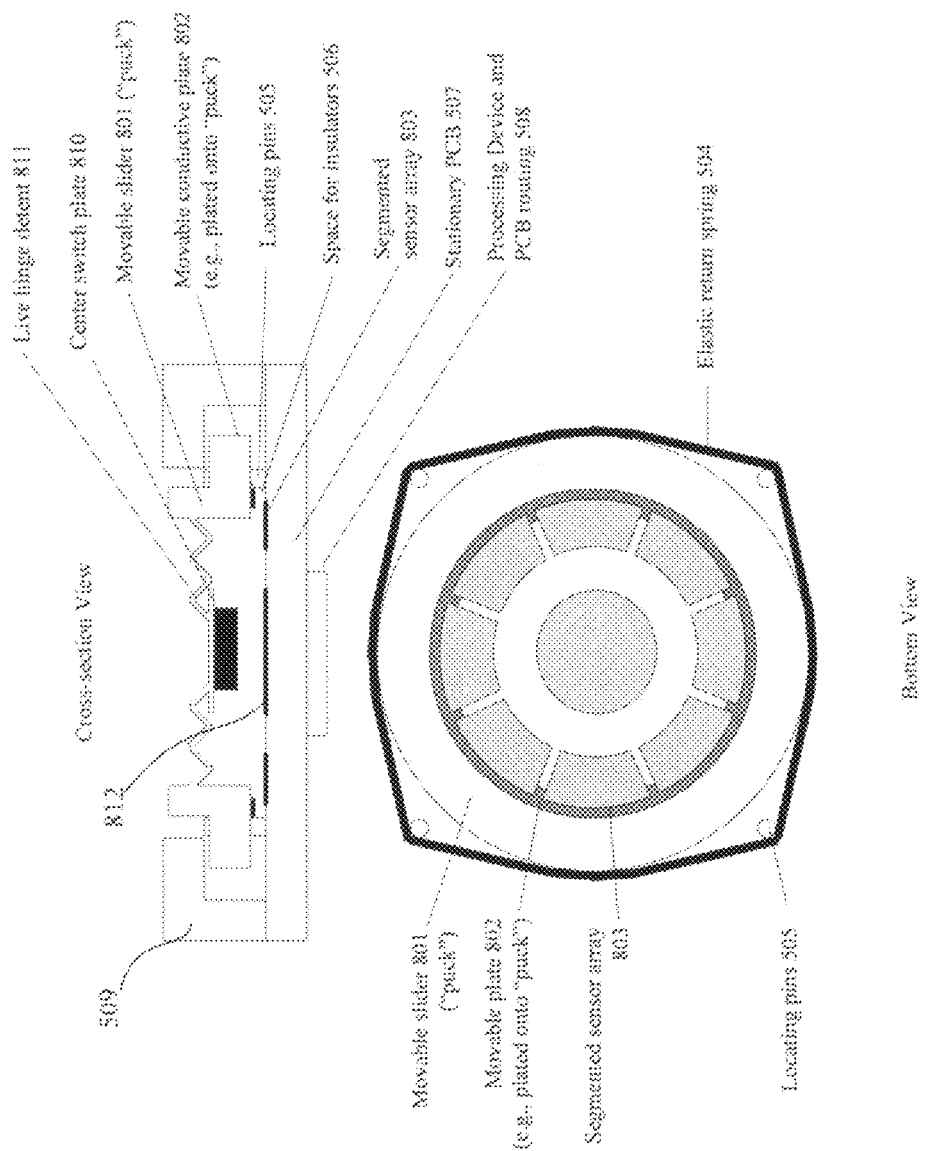
FIG. 8 illustrates a bottom view of a segmented sensor array and movable plate according to another embodiment of the present invention.

FIG. 8 illustrates a bottom view of a segmented sensor array and movable plate 802 according to another embodiment of the present invention. The pointing device 880 of FIG. 8 includes similar components, indicated by similar reference numbers, as described with respect to the pointing device 580 of FIG. 5. The pointing device 880 includes a segmented sensor array 803 fabricated on a stationary PCB 507. As described above, the processing device (e.g., 210) and corresponding PCB routing (e.g., conductive traces) 508 may be disposed on one side of the stationary PCB 507, for example, the processing device and PCB routing 508 is disposed on the opposite side of the stationary PCB 507 than the segmented sensor array 803. The pointing device 580 also includes a housing 509 coupled to the stationary PCB 507. Within the housing 509 is disposed a movable slider (e.g., puck) 801, which is a moveable conductive object that is configured to move in a plane that is parallel to the plane in which the segmented sensor array 803 is disposed.

The sensor array 803 differs from the sensor array 503 in that the sensor elements are not completely tapered in pie or wedge shapes towards the center, but are disposed in a ring configuration. In this embodiment, the sensor elements form an outer-sensing area, and although the sensor elements are tapered towards the center of the ring configuration, the sensor elements do not taper all the way to the center of the ring configuration, but includes an inner sensing area in which a button may be disposed. In this embodiment, the button includes the additional sensor element 812 upon which the presence of a conductive object may be detected for button activation.

The moveable slider 801 also differs from the moveable slider 501, in that the moveable slider 801 includes a moveable conductive plate 802 and a center switch plate 810. In one embodiment, the center switch is a "live hinge" detent, molded into the moveable slider 801, with a metal capacitive plate (e.g., center switch plate 810) on the bottom side. When the "live hinge" detent is depressed, the center switch plate 810 approaches the additional sensor element 812, increasing the capacitance measured on the additional sensor element 812. The capacitance on the additional sensor element 812 may be measured in the same time period (e.g., sequentially) and in the same manner as the circular sensor elements in the sensor array 803. Alternatively, the center switch could be mechanical, and not capacitive.

As described above with respect to the moveable slider 501, the moveable slider 801 includes a conductive surface on at least a portion of the moveable slider 801; for example, the moveable slider 801 includes a conductive plate 802 that moves with the moveable slider 801. In one embodiment, the conductive plate 802 is a circular conductive trace that is aligned with an outer diameter of the segmented sensor array 803. In another embodiment, the conductive plate 802 is a conductive strip plated onto the movable slider 801, and the outer diameter of the sensor array 803 is aligned with the center of the conductive strip of the moveable slider 801. Alternatively the conductive plate 802 is plate 802 is aligned with an inner diameter of the segmented sensor array 803.

Also, as described above, between the conductive plate 802 and the sensor elements of the sensor array 803 is a space 506 for insulators. In one embodiment, the insulating layer between the sensor array 803, the moveable conductive plate 802, and the center switch plate 810 is a solder mask, such as used in PCB fabrication. In another embodiment, the pointing device 280 uses a very thin insulating separator of a more durable type, such as an ABS sheet, commonly used for labels, disposed in the space 506.

In this embodiment, the moveable slider 801 is a moveable puck-shaped object having a center portion in which the live hinge detect 811 and center switch plate 810 are disposed. This configuration allows the processing device to determine the deflection of the moveable slider 801 (e.g., for determining the relative position and direction of the moveable slider 801), as well as button activation via the center button. Other configurations are possible, such as implementing a mechanical switch under the housing. Upon pressing the moveable slider, the entire housing may be press down on a mechanical button for button activation. Alternatively, other configurations are possible to implement button activation and deflection determinations.

In one embodiment, the movable plate 802 is disposed with the segmented sensor array so that the outer-diameter of the segmented sensor array is aligned at the center of the movable plate 802, for a known, zero position. The pointing device 880 also includes a self-centering device, as described above with respect to FIG. 5. The self-centering device may include locating pins 505 and elastic return spring 504 or other types of spring mechanisms. As a user moves the movable slider 801 away from the known, zero position, the self-centering device automatically returns the movable slider 801 back to the known, 801 back to the known, zero position. In another embodiment, the self-centering device includes a spring mechanism coupled between the housing 509 and the movable slider 801. In another embodiment, multiple posts made be disposed to surround the outer circumference of the movable slider 801 and the spring mechanism is circumferential linear spring disposed around the posts, for example, the circumferential linear spring is stretched over the posts and the outside of the moveable slider 801 to hold the moveable slider 801 in the zero position by the circumferential linear spring. The spring may be fabricated from an elastic material, for example, an O-ring of suitable dimensions that is disposed around the posts and the moveable slider 801. Since the spring (i.e., O-ring) is a single piece, the spring mechanism may provide constant tension when at the zero position. In other embodiments, the spring mechanism may be, for example, a leaf spring, a tension-coil spring, a compression-coil spring, or the like.

The pointing device 880 is coupled to the processing device 210 by way of conductive traces. For example, each of the sensor elements of the sensor array 803 are coupled to a pin of the processing device 210, as described herein. The processing device is configured to receive multiple signals from the sensor array (e.g., from each of the sensor elements) and to determined a deflection of a movable conductive plate 802 that is moved over the sensor array 803, as well as detect the presence of a conductive object (e.g., center switch plate 810) on, or in proximity to, the additional sensor element 812.

As described above the sensor array may be disposed in the first plane of the circuit board and the movable conductive plate 802 is moved in a second plane that is substantially parallel to the first plane. The conductive plate 802 and the sensor elements of the sensor array 803 are insulated by an insulating layer, for example, a solder mask or an an ABS sheet. In one embodiment, the housing 509, the circuit board 507, and the movable slider 801 are disposed in a joystick that implements relative positioning and button activation. The processing device 210 may also disposed in the joystick, or alternatively, remotely from the joystick. In one embodiment, the joystick is implemented in a keyboard of a laptop computer. Alternatively, the joystick may be implemented as a user interface device in other devices.

It should be noted that a large number of sensor configurations are possible, some of which may have advantages for sensitivity or linearity of deflection measurement. For example, although the embodiments described and illustrated with respect to FIGS. 5 and 8 have sensor arrays having eight sensor elements, alternatively, other numbers of sensor elements may be used to detect the deflection of the moveable object having a conductive surface. In one embodiment, two sensor elements can be used to determine the deflection direction and magnitude in one dimension. In another embodiment, four sensor elements can be used to determine the deflection direction and magnitude in two dimensions. Alternatively, three or four or more sensor elements may be used to determine the deflection direction and magnitude in one or more dimensions.

Embodiments of the present invention may have one or more of the following advantages. The device may be mechanically thin compared to force sensor joystick and can fit in the corner of a keyboard or between keys of the keyboard. The device may be significantly smaller than a conventional x-y track pad or mouse. Moving parts are non-wearing and non-contacting and easily disassembled for cleaning. Simple capacitance measurement results in easily calculated vector output values. Native resolution may be easily adjusted by setting number of sensor elements and the output resolution may be adjustable in software. The device may be easily adapted to many sizes of sensors and deflections. The capacitance measurement is simple and robust. The pointing device may also be configured to provide tactile feedback to the user.

The device described herein could replace force sensing joystick in PC (desktop and laptop) keyboard or single-button mouse built into the keyboard. The device described herein may provide low-cost replacement for touch sensor pads in some applications.

Figure 9:
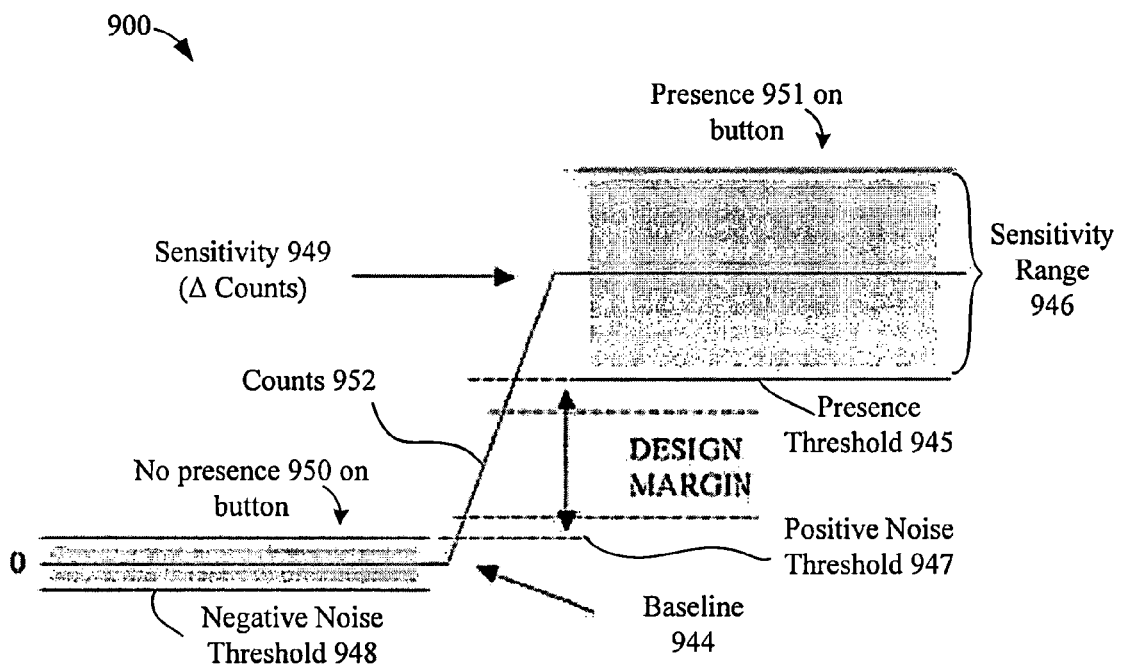
FIG. 9 illustrates a graph of the sensitivity of a single touch-sensor button.

FIG. 9 illustrates a graph of a sensitivity of a single touch-sensor button. Graph 900 includes the counts 952 as measured on a single touch-sensor button for "no presence" 950 on the touch-sensor button, and for a "presence" 951 on the touch-sensor button. In one embodiment, when the "presence" 951 is detected, a button activation is determined. The "No presence" 950 occurs when the user interface does not detect the presence of the conductive object. The "No presence" 950 is detected between a range of noise. The range of noise may include a positive noise threshold 947 and a negative noise threshold 948. So long as the counts 952 are measured as being between the positive and negative thresholds 947 and 948, the user interface detects "no presence" 950. The "presence" 951 is when the user interface detects the presence of the conductive object (e.g., finger). The "Presence" 951 is detected when the counts 952 are greater than a presence threshold 945. The presence threshold 945 indicates that a presence of a conductive object is detected on the user interface during touch-activation sensing. The sensitivity 949 (Cf/Cp) of the single button operation is such that when it detects the presence of the conductive object, the capacitance variation ($\Delta n$) is above the presence threshold 945. The sensitivity 949 may have a range, sensitivity range 946. Sensitivity range 946 may have a lower and range 946 may have a lower and upper limit or threshold. The lower threshold is equal to or greater than the presence threshold 945, allowing a "presence" 951 to be detected on or in proximity to the touch-sensor button. The user interface may be configured such that there is a design margin between the presence threshold 945 and the positive noise threshold 947. The sensitivity range 946 is based on the surface area of the touch-sensor button, as well as other factors.

Although FIG. 9 is usually representative of the sensitivity of a single touch-sensor button, FIG. 9 may also illustrate the sensitivity of a group of coupled sensor elements. It should also be noted that the values of parameters in the graph of FIG. 9 may be different for the different configurations. For example, in scanning a sensor element individually, the presence threshold 945 may be set to have an arbitrary count of 100 counts, based on factors such as scan speed, surface area, and the like. It should be noted in this embodiment, separate baseline measurement can be made for each of the sensor elements that are being measured individually, and the capacitance on a particular sensor element is compared against a presence threshold, such as the presence threshold 945, to determine if the particular sensor element has been activated. However, using the same hardware (e.g., sensor elements, ground conductors, capacitance sensing pins, processing device, and the like), in scanning the group of coupled sensor elements, the presence threshold may be set to have a similar or dissimilar presence threshold, for example, a lower count than the 100 counts used in the other configuration. Alternatively, other thresholds may be set for the different configurations, such as for the button-activation sensing or the proximity sensing.

Figure 10:
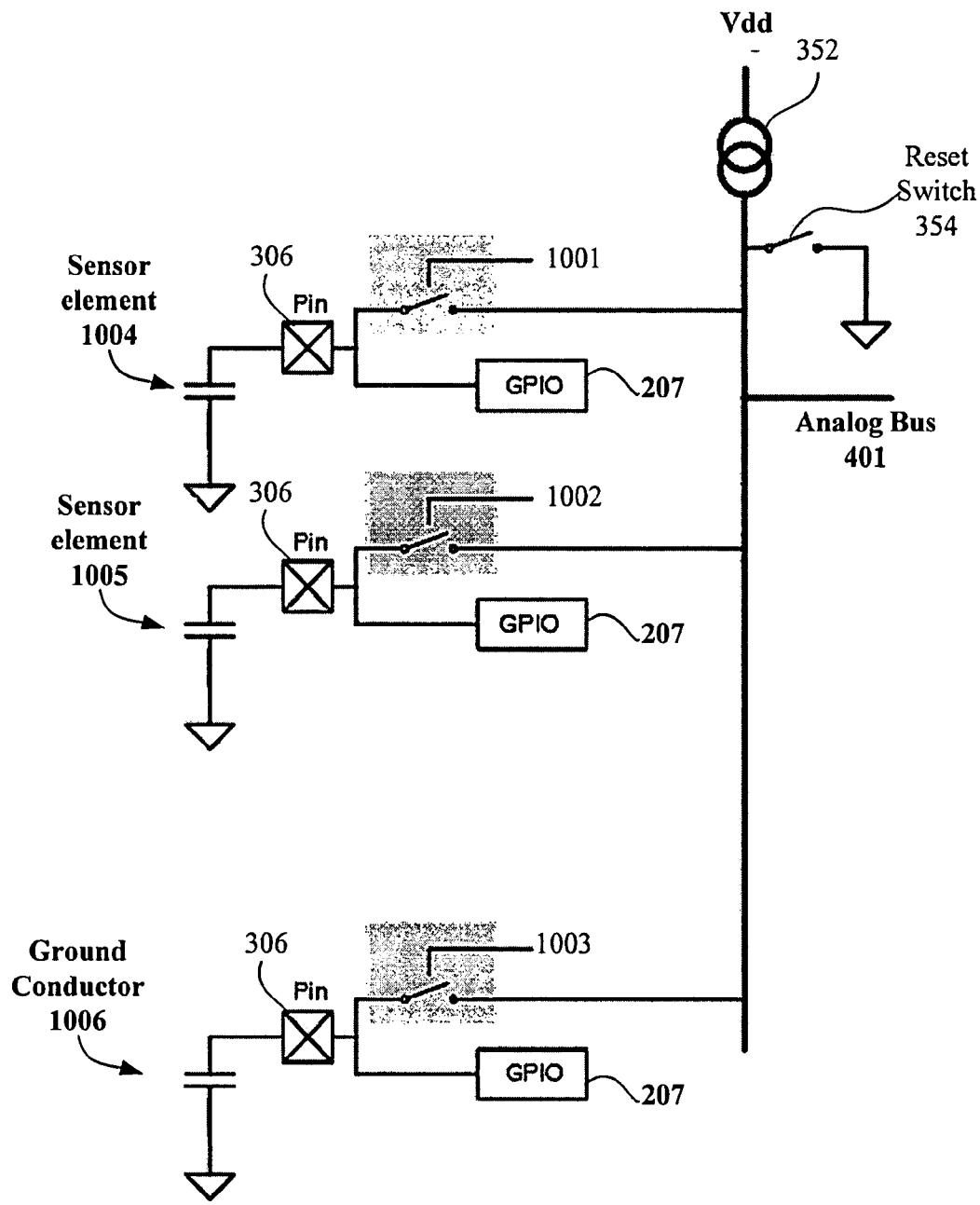
FIG. 10 illustrates one embodiment of a selection circuit coupled to an analog bus for measuring capacitance on sensor elements.

FIG. 10 illustrates one embodiment of a selection circuit 420 coupled to an an analog bus 401 for measuring capacitance on the sensor elements 1004 and 1005. As previously described, the selection circuit 420 is coupled to the sensor elements (e.g., 1004, 1005, and ground conductor 1006) via capacitance sensing pins 306, current source 352, reset switch 354, and a comparator 353 (not illustrated) via analog bus 401. The selection circuit 420 may be configured to sequentially select a sensor element of the multiple sensor elements 1004 and 1005 to provide the charge current and to measure the capacitance of each sensor element 1004 and 1005, individually.

It should be noted that although the selection circuit 420 is illustrated and described with respect to a relaxation oscillator having the current source 352, reset switch 354, and comparator 353, alternatively, the selection circuit 420 is implemented with other types of circuits for measuring capacitance, such as the circuit 375 that includes the sigma-delta modulator 360, or other types of capacitance measuring circuits, such as current versus voltage phase shift measurement, resistor-capacitor charge timing, capacitive bridge divider, charge transfer, sigma-delta modulators, charge-accumulation circuits, or the like.

In one exemplary embodiment, the selection circuit 420 is a multiplexer array of the relaxation oscillator 350 or circuit 375. Alternatively, selection circuit 420 may be other circuitry outside the relaxation oscillator 350 or circuit 375, or even outside the capacitance sensor 201 to select the sensor element to be measured. The selection circuit 420 may also be used to ground the sensor elements that are not being measured. This may be done in conjunction with a dedicated pin in the GPIO port 207. The selection circuit 420 may also be used to couple all the sensor elements 1004 and 1005 at the same time. When the sensor elements 1004 and 1005 are coupled together the processing device 210 may be processing device 210 may be configured to measure the capacitance on the two sensor elements. Alternatively, the processing device 210 may sequentially or simultaneously scan each of the sensor elements individually. In one embodiment, when the sensor element 1004 is being scanned, the sensor element 1005 is coupled to ground. In another embodiment, the ground conductor 1006 is a ground plane that is disposed adjacent to or surrounding the sensor elements 1004 and 1005. The processing device 210 can select the sensor elements 1004 and 1005, as well as the ground conductor 1006, using selection control lines 1001, 1002, and 1003, respectively.

Figure 11:
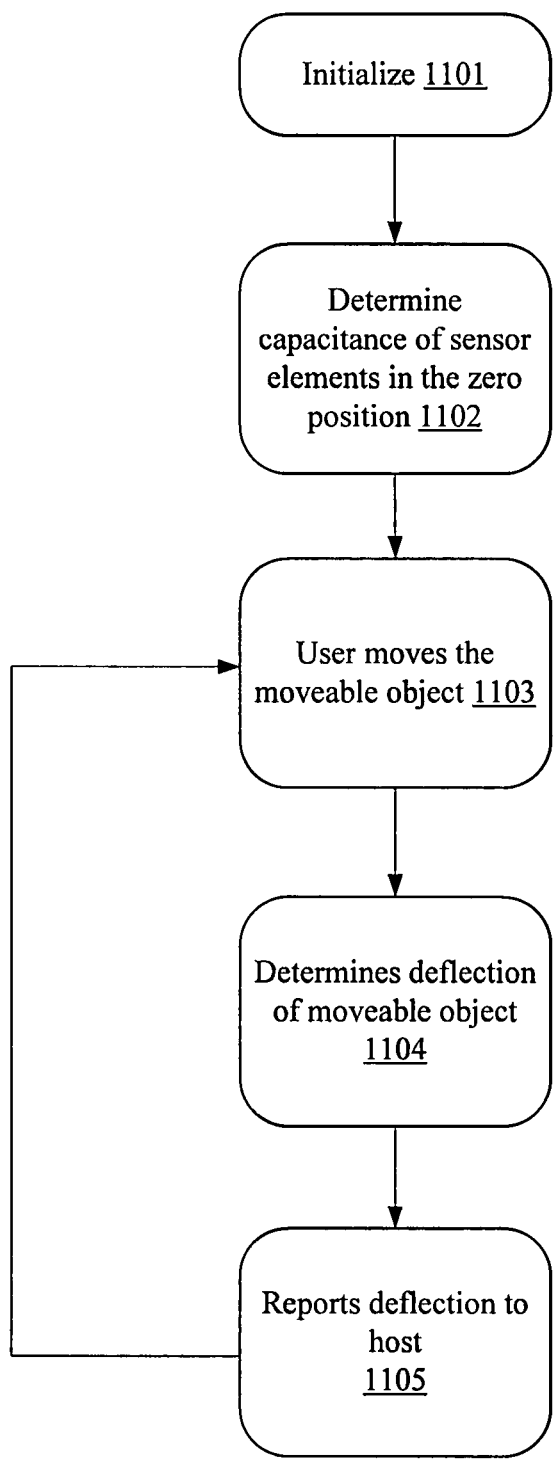
FIG. 11 illustrates a flow chart of one embodiment of a method for detecting a moveable conductive object of a pointing device.

FIG. 11 illustrates a flow chart of one embodiment of a method 1100 for detecting a moveable conductive object of a pointing device. Method 1100 is initialized in operation 1101, and once initialized, the device determines the capacitances of each sensor element in the zero position, operation 1102. For example, baseline measurement may be performed for each of the sensor elements, including an additional sensor element (e.g., 812) that is used for button activation. After the capacitance is determined for each of the sensor elements, the moveable object (e.g., moveable slider 501 or 801) is moved by the user, operation 1103. The device then determines a deflection of the moveable object (e.g., moveable conductive plate of the moveable object), operation 1104. The device may determine the deflection by measuring a capacitance of each of the sensor elements in the second position (e.g., partially or fully-deflected position), as described above. The deflection may be presented as a vector of the deflection magnitude and/or direction in terms of x- and y-directions, or alternatively, as r and theta. The deflection may be determined by computing a two-sided centroid, as described above, such as by computing a minimum centroid and a maximum centroid and combining them to compute the deflection magnitude compute the deflection magnitude and deflection direction of the moveable object. Once the deflection is determined, such as the deflection direction and magnitude, the device reports the deflection to the host (e.g., application of host 250), operation 1105. Alternatively, the device may merely measure the capacitance and send the raw data to the host for determining the deflection. Once the user releases the moveable object, the self-centering device of the pointing device automatically centers the moveable object to the zero position from the second position to the zero position, and allows the user to move the moveable object from the zero position at operation 1103.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A pointing device comprising:
    a moveable object comprising a ring-shaped conductive surface;
    a plurality of radial sensor elements in a ring configuration disposed on a substrate and configured to capacitively couple with the ring-shaped conductive surface of the moveable object, the ring configuration of the plurality of radial sensor elements having an outer circumference and an inner circumference, wherein the ring-shaped conductive surface is disposed in a default position such surface-area overlaps of the plurality of radial sensor elements and respective portions of the ring-shaped conductive surface are substantially equal, wherein the surface-area overlaps change when the moveable object is moved from the default position, and wherein the diameter of the ring-shaped conductive surface is greater than the diameter of the plurality of radial sensor elements;
    a sensing area disposed within the inner circumference of the plurality of radial sensor elements and configured to capacitively couple with another conductive surface of the moveable object when a live hinge molded into the moveable object is depressed in a direction perpendicular to a first plane, wherein the other conductive surface is fixed to the live hinge; and
    a processing device coupled to the substrate, the processing device configured to scan the plurality of radial sensor elements, sense movement of the moveable object parallel to the substrate based on changes in capacitances of the plurality of radial sensor elements and sense movement of the moveable object perpendicular to the substrate based on a change in capacitance of the sensing area, wherein the changes in capacitances of the plurality of radial sensor elements is caused by the changes in the surface-area overlaps of the respective portions of the ring-shaped conductive surface.

2. The pointing device of claim 1, further comprising a self-centering device coupled to the moveable object, wherein the self-centering device is configured to center the moveable object to the default position after being moved, wherein the self-centering device comprises a spring component.

3. The pointing device of claim 1, further comprising an insulating layer between the first plane and a second plane in which the moveable object is configured to move.

4. The pointing device of claim 1, wherein the plurality of radial sensor elements are disposed in a substantially circular pattern, wherein the moveable object comprises a conductive trace, wherein the outer circumference of the plurality of radial sensor elements in the substantially circular pattern is substantially aligned with the center of the conductive trace when the moveable object is in a default position, and wherein each of the plurality of radial sensor elements comprises a tapered shape that tapers towards the center of the substantially circular pattern.

5. The pointing device of claim 1, wherein the outer circumference of the plurality of radial sensor elements in the ring configuration is substantially aligned with the center of the conductive trace when the moveable object is in a default position, and further comprising a button disposed in the sensing area.

6. The pointing device of claim 1, further comprising a sensing element disposed in the sensing area and configured to detect the movement of the moveable object perpendicular to the first plane.

7. The pointing device of claim 1 further comprising a spring component configured to return the moveable object to the default position.

8. The pointing device of claim 7, wherein the single spring component is an o-ring of elastic material.

9. The pointing device of claim 7 further comprising a plurality of posts disposed to surround the outer circumference of the moveable object, wherein the spring component is a single spring disposed around the plurality of posts and at least in partial contact with the outer circumference of the moveable object.

10. An apparatus comprising:
a processing device configured to perform a plurality of scans to receive a plurality of signals from a plurality of radial sensor elements, the processing device configured to scan the plurality of radial sensor elements to determine a deflection of a moveable ring-shaped conductive plate, of a moveable object, that is moved relative to the plurality of radial sensor elements based on the plurality of signals;
the plurality of radial sensor elements in a ring configuration disposed in a first plane and configured to be used by the processing device to sense movement of the moveable ring-shaped conductive plate parallel to the first plane, the plurality of radial sensor elements disposed on a surface of a circuit board, the ring configuration of plurality of radial sensor elements having an outer circumference and an inner circumference, wherein the moveable ring-shaped conductive surface is disposed in a default position such that surface-area overlaps of the plurality of radial sensor elements and respective portions of the moveable ring-shaped conductive surface are substantially equal, wherein the surface-area overlaps change when the moveable object is moved from the default position, and wherein the diameter of the moveable ring-shaped conductive surface is greater than the diameter of the plurality of radial sensor elements;
a sensing area disposed on the surface of the circuit board and within the inner circumference of the plurality of radial sensor elements and configured to be used by the processing device to sense movement of a switch plate fixed to a live hinge molded into the moveable object, wherein the movement of the switch plate is perpendicular to the first plane when live hinge is depressed;
wherein the processing device is coupled to the circuit board;
a housing coupled to the circuit board, wherein circuit board is stationary relative to the housing; and
an insulating layer disposed between the plurality of radial sensor elements and the moveable conductive plate.

11. The apparatus of claim 10, wherein the housing, circuit board, and moveable object are disposed in a joystick of a keyboard.

12. The apparatus of claim 10, wherein the live hinge comprises a button configured to be depressed by perpendicular movement of a center switch plate coupled to the live hinge.

13. The apparatus of claim 10, further comprising a sensing element disposed in the sensing area and configured to detect the movement of the moveable object perpendicular to the first plane.

14. The apparatus of claim 10 further comprising the moveable ring-shaped conductive plate coupled to the housing by a spring component, wherein the spring component is configured to return the moveable conductive plate to a default position after being moved.

15. The apparatus of claim 14 further comprising a plurality of posts disposed to surround the outer circumference of the moveable conductive plate, wherein the spring component is a single spring disposed around the plurality of posts and at least in partial contact with the outer circumference of the moveable object.

* * * * *